US011263738B2

(12) United States Patent
Li et al.

(10) Patent No.: US 11,263,738 B2
(45) Date of Patent: Mar. 1, 2022

(54) DEFECT DETECTION IN LYOPHILIZED DRUG PRODUCTS WITH CONVOLUTIONAL NEURAL NETWORKS

(71) Applicant: GENENTECH, INC., South San Francisco, CA (US)

(72) Inventors: Zheng Li, South San Francisco, CA (US); Calvin Tsay, Austin, TX (US)

(73) Assignee: GENENTECH, INC., South San Francisco, CA (US)

( * ) Notice: Subject to any disclaimer, the term of this patent is extended or adjusted under 35 U.S.C. 154(b) by 129 days.

(21) Appl. No.: 16/654,200

(22) Filed: Oct. 16, 2019

(65) Prior Publication Data

US 2020/0126210 A1   Apr. 23, 2020

Related U.S. Application Data

(60) Provisional application No. 62/748,304, filed on Oct. 19, 2018, provisional application No. 62/852,237, filed on May 23, 2019.

(51) Int. Cl.
*G06T 7/00* (2017.01)
*G06N 20/00* (2019.01)
(Continued)

(52) U.S. Cl.
CPC ............ *G06T 7/0004* (2013.01); *G06F 16/53* (2019.01); *G06F 17/15* (2013.01); *G06N 3/04* (2013.01);
(Continued)

(58) Field of Classification Search
CPC   G01N 33/5091; G01N 33/5097; G06F 16/53; G06F 16/532; G06F 17/15;
(Continued)

(56) References Cited

U.S. PATENT DOCUMENTS

| 4,912,318 A * | 3/1990 | Kajiura .................. B07C 5/126 |
| | | 209/526 |
| 2017/0106885 A1 | 4/2017 | Singh | |

FOREIGN PATENT DOCUMENTS

| JP | 3351910 B2 | 12/2002 |
| JP | 2017199388 A | 11/2017 |
| KR | 20160024851 A | 3/2016 |

OTHER PUBLICATIONS

International Search Report and Written Opinion for International Application No. PCT/US2019/056511, dated Apr. 6, 2020.
(Continued)

*Primary Examiner* — Manuchehr Rahmjoo
(74) *Attorney, Agent, or Firm* — Morrison & Foerster LLP

(57) ABSTRACT

In one embodiment, a method includes receiving one or more querying images associated with a container of a pharmaceutical product, each of the one or more querying images being based on a particular angle of the container of the pharmaceutical product, calculating one or more confidence scores associated with one or more defect indications, respectively for the container of the pharmaceutical product, by processing the one or more querying images using a target machine-learning model, and determining a defect indication for the container of the pharmaceutical product from the one or more defect indications based on a comparison between the one or more confidence scores and one or more predefined threshold scores, respectively.

54 Claims, 17 Drawing Sheets

*100*

1. CLEAN VIAL

2. CHECK FILL LEVEL

3. CHECK FOR OTHER DEFECTS

4. MARK DEFECTS

5. RECORD AND SORT

6. INSPECTION COMPLETE

(51) Int. Cl.
*G06N 3/04* (2006.01)
*G06F 16/53* (2019.01)
*G06F 17/15* (2006.01)

(52) U.S. Cl.
CPC .... *G06N 20/00* (2019.01); *G06T 2207/20081* (2013.01); *G06T 2207/20084* (2013.01)

(58) Field of Classification Search
CPC ........ G06N 20/00; G06N 3/04; G06N 3/0454; G06N 3/084; G06T 2207/10016; G06T 2207/20081; G06T 2207/20084; G06T 2207/30108; G06T 7/0004
See application file for complete search history.

(56) References Cited

OTHER PUBLICATIONS

Tsay, et al., Automating Visual Inspection of Lyophilized Drug Products with Multi-Input Deep Neural Networks, 2019 IEEE 15th International Conference on Automation Science and Engineering (Case), pp. 1802-1807. Sep. 19, 2019.

\* cited by examiner

200

DEFECT DETECTION IN LYOPHILIZED DRUG PRODUCTS WITH CONVOLUTIONAL NEURAL NETWORKS

PRIORITY

This application claims the benefit, under 35 U.S.C. § 119(e), of U.S. Provisional Patent Application No. 62/748,304, filed 19 Oct. 2018, and U.S. Provisional Patent Application No. 62/852,237, filed 23 May 2019, each of which is incorporated herein by reference.

FIELD OF THE INVENTION

The present disclosure relates to an inspection system and methods using machine-learning algorithms, such as convolutional neural networks, to detect and classify defects of lyophilized protein therapeutics, including antibodies.

BACKGROUND

The global market for protein therapeutics was valued at $21.3 billion for 2015 and is anticipated to grow to over $46 billion by the year 2024. Increased adoption and development of such technologies has emphasized the challenges in handling, storing, and distributing protein therapeutics, which are often more unstable than traditional small-molecule pharmaceuticals. With limited stability, protein drug products are often lyophilized, or freeze dried, to minimize degradation and aggregation for storage and distribution. The three processing steps to lyophilization including freezing, primary drying, and secondary drying which together removes the bulk of the water surrounding a protein product and results in solid cake product. The physical packaging (often in glass vials) plays a significant role in the stability of the lyophilized protein therapeutic. For example, special vial stoppers allow venting of water vapor and, are often dehydrated to prevent moisture release. In addition, the glass of the vial allows for efficient heat transfer between shelf and vial. The packaging of the lyophilized protein therapeutic is often completed by crimping the lids of the vials containing the product, and the final lyophilized protein products are generally visually inspected to ensure the absence of foreign contaminants and packaging defects.

The main challenge of these inspections is finding contaminants in the solid cakes. While liquid products are spun quickly to identify possible contaminants by their movement, contaminants in solid products (such as lyophilized protein therapeutics) are immobile and must be located visually. Additionally, contaminants are typically small, leading to inconsistent detection through manual inspection. Other packaging defects can also significantly affect the drug efficacy and safety, such as improper product fill level (e.g., too much or too little lyophilized protein product) or cracks in the vial that can expose the lyophilized cakes to external moisture. Moreover, cosmetic defects, such as minor glass bruises or scratches, are also identified to identify potential manufacturing issues. A variety of manual and automated inspection techniques are generally used to inspect the filled vials, but they must be relatively quick and avoid impacting the drug product. FIG. 1 illustrates an example of a human inspection process 100 of vials of a lyophilized protein therapeutic. As can be seen, the process 100 may comprise six steps which are clean vial, check fill level, check for other defects, mark defects, record and sort, and inspection complete. FIG. 2 illustrates an example inspection environment 200 for human inspection of vials of a lyophilized protein therapeutic. As both manual and automated inspection are completely visual processes, high incidents of "fogging" on vials can easily be confused for vial scratches, or even cracks. "Fogging" refers to the white haze of different patterns that can often be observed on the glass vials above the product cake after lyophilization. Although fogging of glass vials has traditionally been viewed as a non-critical, purely cosmetic defect in terms of drug efficacy, high incidents of fogging can lead to difficulty in manufacturing lyophilized drug products due to challenges in inspection (manual or automatic). Inspection techniques should ideally differentiate fogging from glass defects with a high degree of accuracy, as recent studies show that it is unlikely that fogging can be completely avoided during manufacturing.

SUMMARY OF PARTICULAR EMBODIMENTS

Herein is provided an inspection system and methods which improve defect detection of lyophilized protein therapeutics, including antibodies.

In particular embodiments, an inspection system disclosed herein may improve defect detection in lyophilized drug products by using complex machine-learning algorithms. The inspection system may use artificial neural networks to train the machine-learning model which may classify images of lyophilized product vials. The inspection system may use transfer learning to reduce the number of samples required in the training of the machine-learning model. As an example and not by way of limitation, the developments of the inspection system may be carried out using an industrial sample of Herceptin (trastuzumab) products. Once the inspection system is developed, it may acquire images of vials to be inspected, classify the vials using the machine-learning model, and return defective vials for further inspection while pass through good vials.

Certain technical challenges exist for achieving the goal of applying machine-learning algorithms to the inspection of lyophilized drug products. One technical challenge includes achieving very high accuracy because not catching defective products can have significant ramifications on patients. Another technical challenge is ensuring that non-defected vials are accurately identified because classifying a clean vial as a defected vial can lead to additional inspections, efficiency losses, increased costs, and potential delays. Indeed, some commercially available automated inspection systems have very poor accuracy with ~80% false positive rates in glass defect detection. The solution presented by the embodiments disclosed herein to address the above challenges is using one or more particular architectures of the machine-learning algorithms, which result in high classification accuracy of both clean or defected vials. Another technical challenge includes the scarcity of defective vial samples suitable for training machine-learning algorithms due to the fact that defect rates range between 0.01-1% for biopharmaceutical drug product. Thus small, representative defect libraries are artificially created for inspection training which result in highly unbalanced datasets and are generally not suitable for training machine-learning algorithms. The solution presented by the embodiments disclosed herein to address the challenge of small, defect libraries is using transfer learning when training the machine-learning algorithms. Although this disclosure describes inspecting particular products via particular systems in particular manners, this disclosure contemplates inspecting any suitable product via any suitable system in any suitable manner.

DESCRIPTION

System Overview

Figure 1:
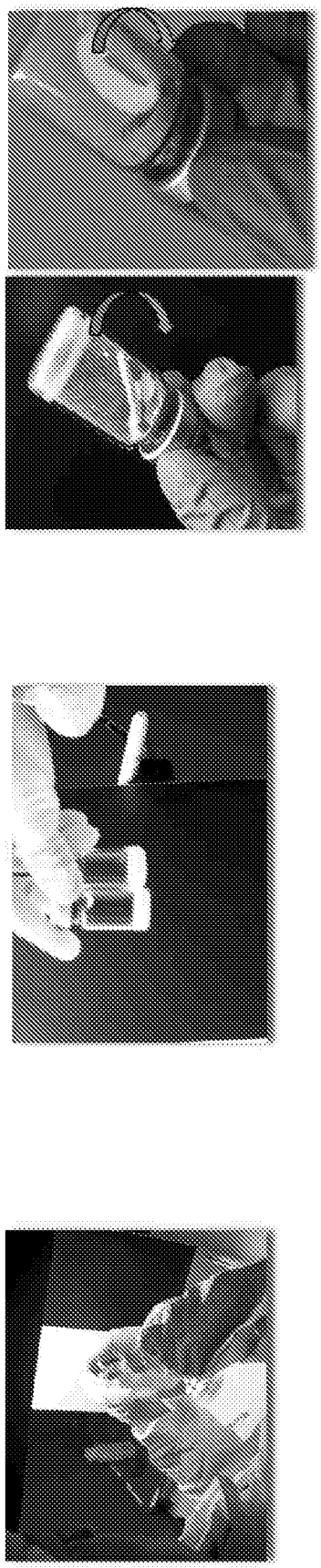
FIG. 1 illustrates an example of a human inspection process of vials.
Figure 1:
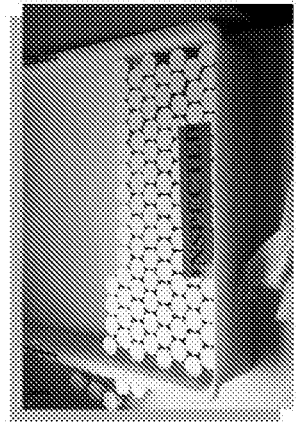
Figure 1:
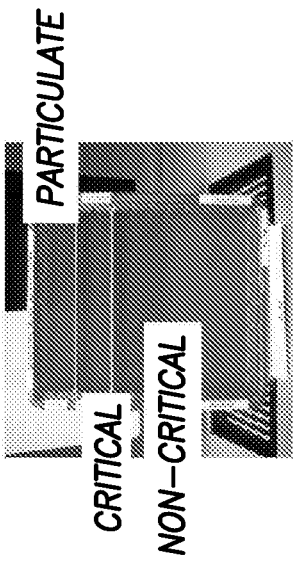
Figure 1:
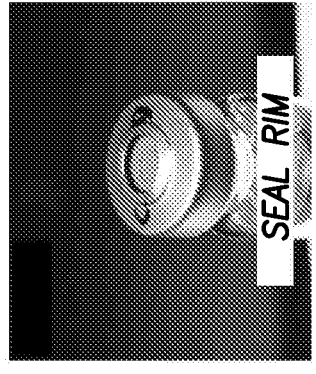
Figure 2:
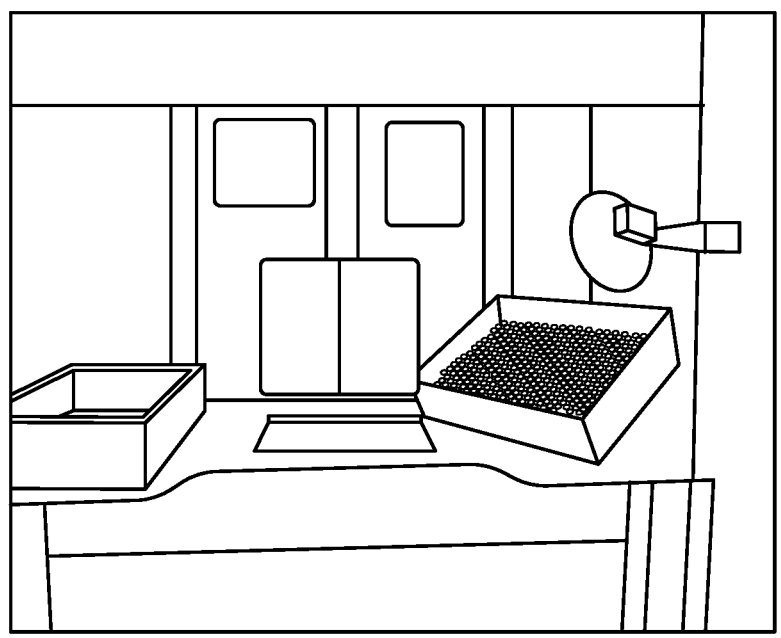
FIG. 2 illustrates an example inspection environment for human inspection of vials.
Figure 3:
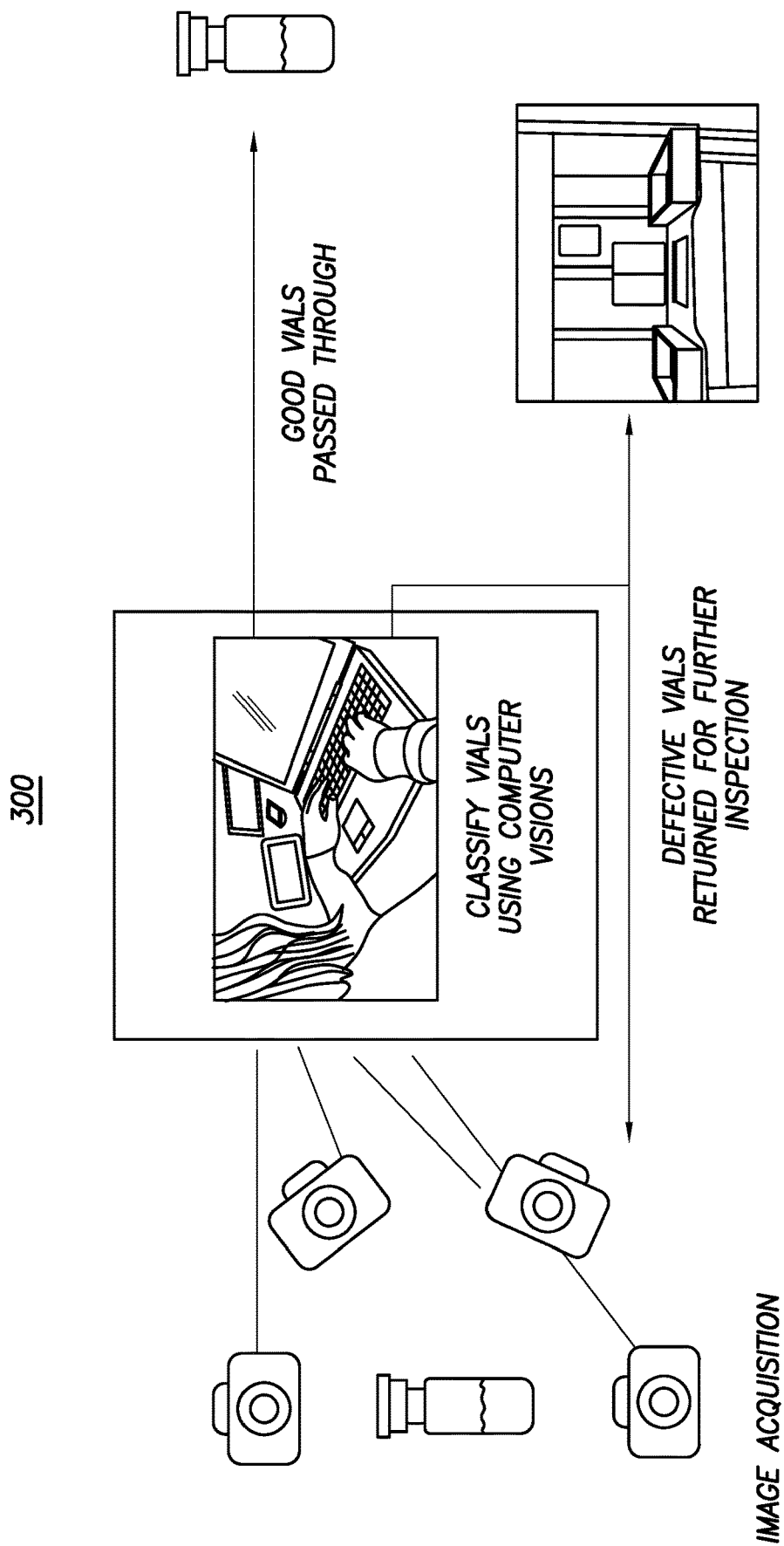
FIG. 3 illustrates an example automated inspection system.

FIG. 3 illustrates an example automated inspection system 300. In FIG. 3, the containers of a pharmaceutical product comprise vials. As can be seen, the work flow of the inspection system 300 may comprise image acquisition of the vials, classifying vials using computer vision models, after which good vials are passed through whereas defective vials may be returned for further inspection. During image acquisition, the inspection system 300 may obtain one or more querying images using one or more optical camera sensors. The one or more optical camera sensors may capture the one or more querying images for the container of the pharmaceutical product from one or more angles, respectively. The inspection system 300 may then receive the one or more querying images associated with the container of the pharmaceutical product. Each of the one or more querying images may be based on a particular viewpoint of the container of the pharmaceutical product. During vial classification, the inspection system 300 may perform two steps. Firstly, the inspection system 300 may calculate, for the container of the pharmaceutical product, one or more confidence scores associated with one or more defect indications, respectively, by processing the one or more querying images using a target machine-learning model. Secondly, the inspection system 300 may determine, for the container of the pharmaceutical product, a defect indication from the one or more defect indications based on a comparison between the one or more confidence scores and one or more pre-defined threshold scores, respectively.

Computer Vision Models

The computer vision models in the inspection system 300 may be based on a convolution neural network. A convolution neural network is more suitable for image classification compared to traditional artificial neural networks (ANNs). ANNs are constructed from simple nodes (artificial neurons) that collectively learn complex, non-linear functions. Each node computes a weighted sum of its inputs and passes the result through a non-linear "activation" function, e.g., the rectified linear function ($f(z)=\max(0, z)$). The nodes are grouped into layers, which share no connections, and can thus be computed simultaneously. In a fully connected ANN, each node in a layer (l) includes all nodes in the previous layer (l−1) as inputs, and each node in a layer is an input to every node in the following layer (l+1). In contrast, in a convolutional neural network (CNN) each node is connected only locally, learning only local motifs. The locally connected design lends itself naturally towards image classification, as local groups of pixels in images are often highly correlated, forming distinctive motifs that are easily detected. The nodes share weights in order to detect the same pattern in different parts of the input image, effectively performing a discrete convolution, from where CNNs derive their name.

Figure 4:
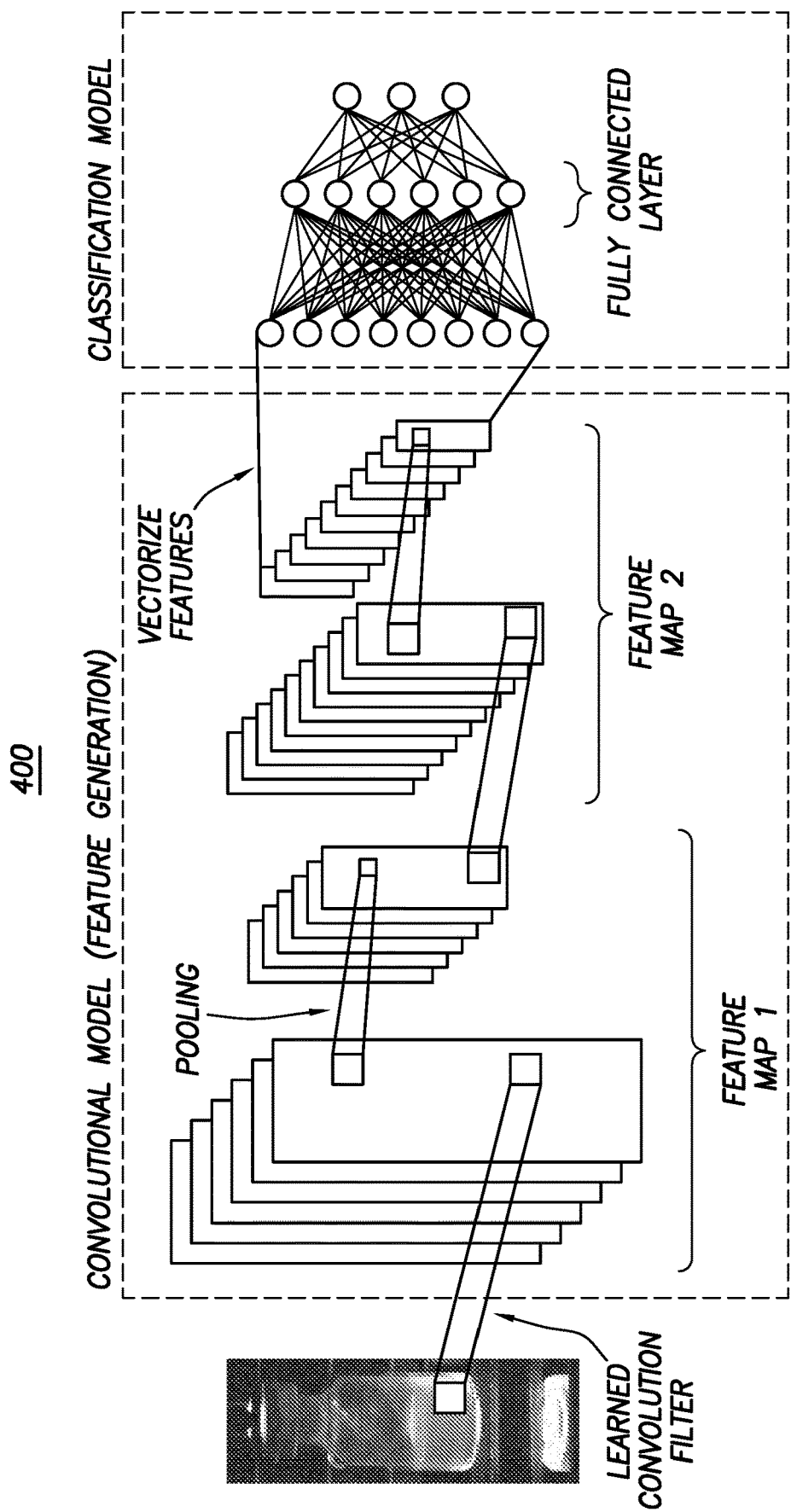
FIG. 4 illustrates an example conventional CNN architecture for image classification.

FIG. 4 illustrates an example conventional CNN architecture 400 for image classification. As shown in FIG. 4, convolutional neural networks (CNNs) may automatically generate features for specific classification tasks with minimal human intervention. The resulting features are typically much more complicated than human-generated features, giving CNNs powerful classification ability. A CNN may be additionally denoted as "deep" when many convolutional layers are connected together, extracting multiple layers of image features. A typical CNN model architecture may involve pooling layers between convolutional layers. A pooling layer compresses the feature representation of the previous layer by grouping pixels in a neighborhood of pre-specified size. The combined neighborhood may be represented with the maximum or average of the associated pixels. Though they reduce model dimensionality, pooling layers merge semantically features into one, coarse-graining the position of each feature without losing much detection ability. After a sequence of alternating convolutional layers (weighted sum and activation function) and pooling layers, the extracted features are passed to a fully connected ANN sub-model for image classification. As an example and not by way of limitation, the image classification architecture 400 displayed in FIG. 4 may comprise two convolutional layers for feature generation and fully connected layers for classification.

Using the conventional image classification architecture 400 for defect detection may be ineffective. As a result, one solution may be using multiple images of each product vial 400 to detect defects at all possible locations. Automatic inspection machines typically take pictures with multiple camera stations to isolate the heel, body, shoulder, and neck of a vial. From each camera station, many images may be acquired while the vial is rotated. Applying the above conventional single-image-classification approach would involve acquiring these images from both defective and non-defective vials. Each image would then need to be labeled for use as training data. However, the labels should correspond to whether the defect can be seen in the particular image, regardless of whether the vial has a defect. The high levels of classification accuracy of CNNs are attributed to the lack of manual feature engineering, but human bias in labeling defect images can propagate to sub-optimal features and model accuracy. As an example and not by way of limitation, two similar images may be given two differing labels (e.g. a scratch barely visible from a particular angle), and the modeling procedure may attempt to differentiate the two images based on very subtle cues, which is a process prone to over-fitting. To avoid the over-fitting issue, the embodiments disclosed herein use new CNN architectures to train the computer vision models for defect detection. The details are presented in Section Model Structures.

Vials and Via Defects

Figure 5:
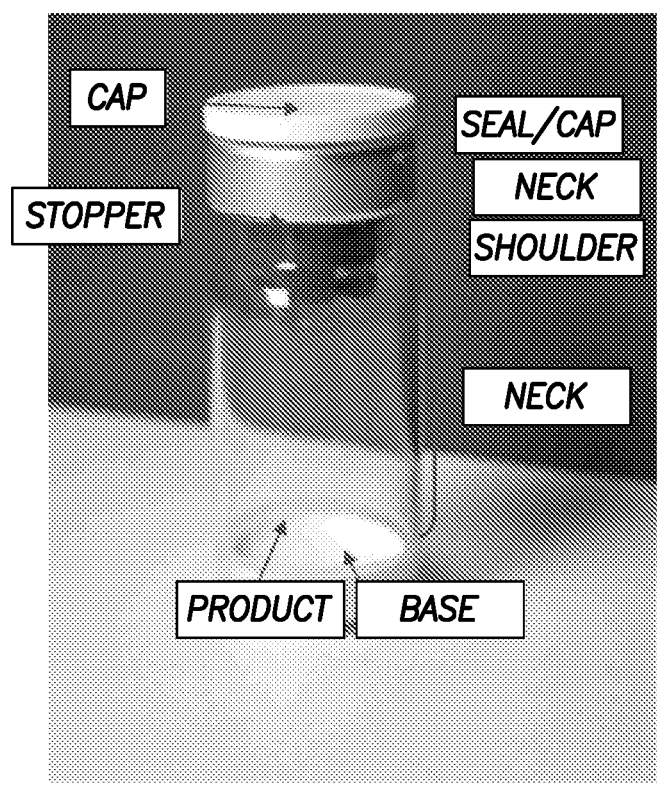
FIG. 5 illustrates an example container, such as a glass vial, containing a lyophilized protein therapeutic, such as an antibody.

In particular embodiments, the container may be made from one or more materials. The one or more materials may comprise one or more of glass, plastic, waxed cardboard, biodegradable material, textile material, crystal material, any suitable material, or any combination thereof. The container can be transparent but does not have to be completely transparent for the inspection system to be able to detect visible defects in the container and/or in the pharmaceutical product (such as a lyophilized protein or antibody). The container may comprise one or more of a cap, a seal, a stopper, a neck, a shoulder, a body, or a base. As an example and not by way of limitation, the container may comprise a vial. FIG. 5 illustrates an example container, such as a glass vial 500, containing a lyophilized protein therapeutic, such as an antibody. As displayed in FIG. 5, the vial 500 comprises a cap, a seal, a stopper, a neck, a shoulder, a body, and a base, and is optionally filled with a lyophilized pharmaceutical product as shown.

A vial 500 (also known as a phial or flacon) is a small glass or plastic vessel or bottle, often used to store medication as liquids, powders or capsules. They can also be used as scientific sample vessels; for instance, in autosampler devices in analytical chromatography. Vial-like glass containers date back to classical antiquity; modern vials 500 are often made of plastics such as polypropylene. There are different types of vials 500 such as a single dose vial 500 and multi-dose vials 500 often used for medications. The single dose vial 500 is only used once whereas a multi-dose vial 500 can be used more than once. The CDC sets specific guidelines on multi-dose vials 500. A vial 500 can be tubular or have a bottle-like shape with a neck. The volume defined by the neck is known as the headspace.

Modern vials 500 are often made out of plastic or sometimes glass. There are often used as storage for small quantities of liquid used in medical or molecular biology applications. There are several different types of commonly used closure systems. For glass vials 500, options include screw vials 500 (closed with a screw cap or dropper/pipette), lip vials 500 (closed with a cork or plastic stopper) and crimp vials 500 (closed with a rubber stopper and a metal cap). Plastic vials 500, which can be molded in plastic, can have other closure systems, such as 'hinge caps' which snap shut when pressed. These are sometimes called flip-tops or snap caps. The bottom of a vial 500 is often flat, unlike test tubes, which have usually a rounded bottom, but this is often not the case for small hinge-cap or snap-top vials 500. The small bottle-shaped vials 500 typically used in laboratories are also known as bijou or McCartney's bottles. The bijou bottle tends to be smaller, often with a volume of around 10 milliliters.

In particular embodiments, the defect indication may comprise one or more of a critical defect, a major defect, or a minor defect. Each of the one or more predefined threshold scores may be determined based on an acceptance quality limit associated with the defect indication. As an example and not by way of limitation, the acceptance quality limit associated with the critical defect may be 0.1, which may determine a particular predefined threshold score for determining whether the defect is a critical defect. As another example and not by way of limitation, the acceptance quality limit associated with the major defect may be 0.4, which may determine another particular predefined threshold score for determining whether the defect is a major defect. As another example and not by way of limitation, the acceptance quality limit associated with the minor defect may be 1.0, which may determine another particular predefined threshold score for determining whether the defect is a minor defect.

In particular embodiments, the inspection system 300 may train different target machine-learning models corresponding to different types of defects. The target machine-learning model may be binary classification model or multi-class classification model. As an example and not by way of limitation, the inspection system 300 may train a target machine-learning model to detect critical defect, which may be a binary classification model. For such a model, the inspection system 300 may use training images that are labeled as critical defect and non-critical defect for training the target machine-learning model. As another example and not by way of limitation, the inspection system 300 may train a target machine-learning model to detect major defect, which may be a binary classification model. For such a model, the inspection system 300 may use training images that are labeled as major defect and non-major defect for training the target machine-learning model. As another example and not by way of limitation, the inspection system 300 may train a target machine-learning model to detect minor defect, which may be a binary classification model. For such a model, the inspection system 300 may use training images that are labeled as minor defect and non-minor defect for training the target machine-learning model. As another example and not by way of limitation, the inspection system 300 may train a target machine-learning model to detect one or more of critical defect, major defect, minor defect, or any combination thereof. When the target machine-learning model detects one type of defects among two types of defects (e.g., critical defect versus minor defect), it may be a binary classification model. When the target machine-learning model detects one type of defects among more than two types of defects (e.g., critical defect, major defect, and minor defect), it may be a multi-class classification model. For a multi-class classification model, the inspection system 300 may use training images that are labeled as multiple types of defects for training the target machine-learning model.

In particular embodiments, the critical defect may comprise one or more of a glass defect, a closure defect, a stopper defect, a fill volume defect, or a critical particulate matter. The glass defect may further comprise one or more of broken, neck crack, finish chip, or other crack. As an example and not by way of limitation, broken glass defect may indicate complete fracturing or discontinuity of the vial 500 surface. As another example and not by way of limitation, neck crack may indicate a refractive fracture that penetrates the glass wall in the neck of the vial 500. As another example and not by way of limitation, finish chip may be a chip in the finish that extends from the vial 500 exterior the vial 500 interior. The closure defect may further comprise one or more of missing seal, uncrimped, stopper exposed (folded seal), or seal rim. As an example and not by way of limitation, uncrimped may indicate that seal is present but not crimped or secured along the entire vial 500 lip/edge circumference and can be completely lifted from the vial 500. As another example and not by way of limitation, seal rim may indicate a deep cut/crack on the side of the seal rim that results in a noticeably loose fit cap or any deep cut/crack on the side of the seal rim that is accompanied by any visible glass damage. The fill volume defect may comprise low fill which indicates that the fill is obviously out of range. The critical particulate matter may further comprise one or more of specks, fibers, or loose glass, which may be visible to the unaided eye.

Based on the different types of critical defect as mentioned above, the inspection system 300 may train different target machine-learning models. The target machine-learning model may be binary classification model or multi-class classification model. As an example and not by way of limitation, the inspection system 300 may train a target machine-learning model to detect a glass defect, which may be a binary classification model. For such a model, the inspection system 300 may use training images that are labeled as glass defect and non-glass defect for training the target machine-learning model. As another example and not by way of limitation, the inspection system 300 may train a target machine-learning model to detect a stopper defect, which may be a binary classification model. For such a model, the inspection system 300 may use training images that are labeled as stopper defect and non-stopper defect for training the target machine-learning model. As another example and not by way of limitation, the inspection system 300 may train a target machine-learning model to detect broken glass defect, which may be a binary classification model. For such a model, the inspection system 300 may use training images that are labeled as broken glass defect and non-broken glass defect for training the target machine-learning model. As another example and not by way of limitation, the inspection system 300 may train a target machine-learning model to detect one or more of a glass defect, a closure defect, a stopper defect, a fill volume defect, a critical particulate matter, broken, neck crack, finish chip, other crack, missing seal, uncrimped, stopper exposed (folded seal), seal rim, low fill, specks, fibers, loose glass, or any combination thereof. When the target machine-learning model detects one type of defects among two types of defects (e.g., a glass defect versus a stopper defect), it may be a binary classification model. When the target machine-learning model detects one type of defects among more than two types of defects (e.g., a closure defect, a fill volume defect, and a critical particulate matter), it may be a multi-class classification model. For multi-class classification model, the inspection system 300 may use training images that are labeled as multiple types of defects for training the target machine-learning model.

In particular embodiments, the major defect may comprise one or more of a glass defect, a closure defect, or a fill volume defect. The glass defect may further comprise one or more of bubble/blister, fused inside/spiticule, or chip. As an example and not by way of limitation, bubble/blister may comprise single or multiple gaseous (embedded) inclusion(s) (i.e., greater than 1.5 mm), which are usually spherical unless distorted during forming. Bubbles may be fully enclosed in the glass whereas blisters may open to the interior or exterior vial 500 surface. As another example and not by way of limitation, fused inside/spiticule may indicate glass fragment (e.g., bead or string) that is attached to the interior vial 500 surface. As another example and not by way of limitation, chip may indicate vial 500 with a section or fragment broken out, in which defect does not fully extend between the vial 500 exterior and the interior of the vial 500 (it does not expose the vial 500 interior to the external environment). The closure defect may further comprise one or more of cap flip-off, partial crimp, or major seal rim. As an example and not by way of limitation, cap flip-off may indicate the cap is missing, i.e., completely detached from the vial 500. As another example and not by way of limitation, partial crimp may indicate an incomplete crimp that allows seal to spin or is loose-fitting. As another example and not by way of limitation, major seal rim may indicate a deep cut/crack on the side of the seal rim that does not result in a noticeably loose-fitting cap and does not exhibit any associated visible glass damage. The fill volume defect may comprise an empty vial 500.

Based on the different types of major defect as mentioned above, the inspection system 300 may train different target machine-learning models. The target machine-learning model may be binary classification model or multi-class classification model. As an example and not by way of limitation, the inspection system 300 may train a target machine-learning model to detect a closure defect, which may be a binary classification model. For such a model, the inspection system 300 may use training images that are labeled as closure defect and non-closure defect for training the target machine-learning model. As another example and not by way of limitation, the inspection system 300 may train a target machine-learning model to detect a fill volume, which may be a binary classification model. For such a model, the inspection system 300 may use training images that are labeled as fill volume defect and non-fill volume defect for training the target machine-learning model. As another example and not by way of limitation, the inspection system 300 may train a target machine-learning model to detect bubble/blister, which may be a binary classification model. For such a model, the inspection system 300 may use training images that are labeled as bubble/blister and no bubble/blister for training the target machine-learning model. As another example and not by way of limitation, the inspection system 300 may train a target machine-learning model to detect one or more of a glass defect, a closure defect, a fill volume defect, bubble/blister, fused inside/spiticule, chip, cap flip-off, partial crimp, major seal rim, an empty vial, or any combination thereof. When the target machine-learning model detects one type of defects among two types of defects (e.g., a glass defect versus a closure defect), it may be a binary classification model. When the target machine-learning model detects one type of defects among more than two types of defects (e.g., a glass defect, a closure defect, and a fill volume defect), it may be a multi-class classification model. For multi-class classification model, the inspection system 300 may use training images that are labeled as multiple types of defects for training the target machine-learning model.

In particular embodiments, the minor defect may comprise one or more of a glass defect, a closure defect, or a stopper defect. The glass defect may further comprise one or more of a bruise, a scratch/abrasion, a surface contamination (e.g., foreign matter vial 500 surface), a stone/inclusion, an airline, a check/fire check (e.g., crizzled), a deformation, a fused/heel sticker/lap, or a bubble/blister. As an example and not by way of limitation, a surface contamination may indicate an unknown substance on exterior of the vial 500 surface. As another example and not by way of limitation, a stone/inclusion may indicate an opaque or transparent inclusion greater than 1 mm in the glass, which may be partially un-melted raw materials, furnace refractory, or crystallized glass. As another example and not by way of limitation, an airline may indicate an elongated gaseous inclusion that appears as a vertical line greater than 0.25 mm wide. As another example and not by way of limitation, a check/fire check may indicate a discontinuity in the glass surface or vertical checks in finish or neck. As another example and not by way of limitation, a fused/hell sticker/lap may indicate glass fragment, string, fold or overlap of glass that is attached to the vial 500 exterior surface, finish area, neck, heel or bottom. The closure defect may further comprise one or more of a bent/dented defect, a discoloration, a seal/crimp appearance defect (e.g., stress mark on seal), or a damaged cap. As an example and not by way of limitation, a bent/dented defect may indicate the seal is bent or deformed from its straight or even condition. The stopper defect may further comprise one or more of a deformed/excess rubber/sunken defect, a discoloration, or a particulate matter. As an example and not by way of limitation, a deformed/excess rubber/sunken defect may indicate a deformation or out-of-shape condition, e.g., the stopper having a flash of rubber hanging from it. As another example and not by way of limitation, a particulate matter may indicate that the stopper has any embedded particle that appears three-dimensional, protruding, or on the surface of the stopper.

Based on the different types of minor defect as mentioned above, the inspection system 300 may train different target machine-learning models. The target machine-learning model may be binary classification model or multi-class classification model. As an example and not by way of limitation, the inspection system 300 may train a target machine-learning model to detect a glass defect, which may be a binary classification model. For such a model, the inspection system 300 may use training images that are labeled as glass defect and non-glass defect for training the target machine-learning model. As another example and not by way of limitation, the inspection system 300 may train a target machine-learning model to detect a stopper defect, which may be a binary classification model. For such a model, the inspection system 300 may use training images that are labeled as stopper defect and non-stopper defect for training the target machine-learning model. As another example and not by way of limitation, the inspection system 300 may train a target machine-learning model to detect a bruise, which may be a binary classification model. For such a model, the inspection system 300 may use training images that are labeled as bruise and no bruise for training the target machine-learning model. As another example and not by way of limitation, the inspection system 300 may train a target machine-learning model to detect one or more of a glass defect, a closure defect, a stopper defect, a bruise, a scratch/abrasion, a surface contamination, a stone/inclusion, an airline, a check/fire check, a deformation, a fused/heel sticker/lap, a bubble/blister, a bent/dented defect, a discoloration, a seal/crimp appearance defect, a damaged cap, a deformed/excess rubber/sunken defect, a discoloration, a particulate matter, or any combination thereof. When the target machine-learning model detects one type of defects among two types of defects (e.g., a bruise versus a surface contamination), it may be a binary classification model. When the target machine-learning model detects one type of defects among more than two types of defects (e.g., a bubble/blister, a bent/dented defect, and a discoloration), it may be a multi-class classification model. For multi-class classification model, the inspection system 300 may use training images that are labeled as multiple types of defects for training the target machine-learning model.

Example Products in Vials

In particular embodiments, the pharmaceutical product may comprise a lyophilized product. The lyophilized product may be associated with one or more product-attributes. Each product-attribute may be a physical form factor, a color, a level of transparency, viscosity, or a fill volume. As an example and not by way of limitation, the physical form factor may comprise one or more of a cake form factor, a powder form factor, a concentrated liquid/syrup form factor, any suitable form factor, or any combination thereof. The critical defect for a lyophilized product may comprise one or more of a cake appearance defect or a fill volume defect. The cake appearance defect may further comprise one or more of a meltback, an extreme shrunken cake, an un-lyophilized cake, or a discoloration. As an example and not by way of limitation, the meltback may indicate partial dissolution of the product cake in the entrapped water, leading to a hollow pocket that is typically seen at the bottom center of the vial 500. As another example and not by way of limitation, the extreme shrunken cake may indicate that the cake may dissolve completely, leaving a visual appearance of viscous gel-like (potentially viscous) or glassy material in the bottom of the vial 500 or in the cake. The fill volume defect may further comprise one or more of high fill or low fill. The major defect for a lyophilized product may comprise a cake appearance defect, comprising one or more of an extreme product splash, a slanted cake, or a shrunken cake. As an example and not by way of limitation, the extreme product splash may indicate that the product has splashed on the stopper prior to lyophilization and dried. As another example and not by way of limitation, the slanted cake may indicate angled cake surface as a result of vial 500 being tipped during lyophilization process. As another example and not by way of limitation, the shrunken cake may indicate an atypical cake formation pulling away from the vial 500 wall. The minor defect for a lyophilized product may comprise a cake appearance defect comprising one or more of a horizontally split cake, a broken cake, or a product splash. As an example and not by way of limitation, the horizontally split cake may indicate that the top of the cake is separated/split from the bottom of the cake. As another example and not by way of limitation, the product splash may indicate that there is product splashed on the vial 500 neck (on glass only).

Overview of the Target Machine-Learning Model

The target machine-learning model may be used by the inspection system 300 to detect defects. The target machine-learning model may be trained offline. As an example and not by way of limitation, the target machine-learning model may be based on a convolutional neural network. At runtime, when the inspection system receives one or more querying images associated with a container of a pharmaceutical product, the inspection system may pass them to the target machine-learning model. The target machine-learning model may calculate one or more confidence scores associated with the one or more defect indications for the one or more querying images. The calculation may comprise the following steps. The first step may be generating one or more feature representations of the one or more querying images by processing the one or more querying images using the target machine-learning model. The second step may be calculating the one or more confidence scores associated with the one or more defect indications based on one or more of a relationship between the feature representations of the plurality of target training images and the plurality of defect indications, or the generated one or more feature representations of the one or more querying images. The target machine-learning model further provide the calculated confidence scores to the inspection system 300. Based on such confidence scores, the inspection system 300 may classify the querying images into a predefined defect, e.g., glass defect.

Model Structures

Figure 6:
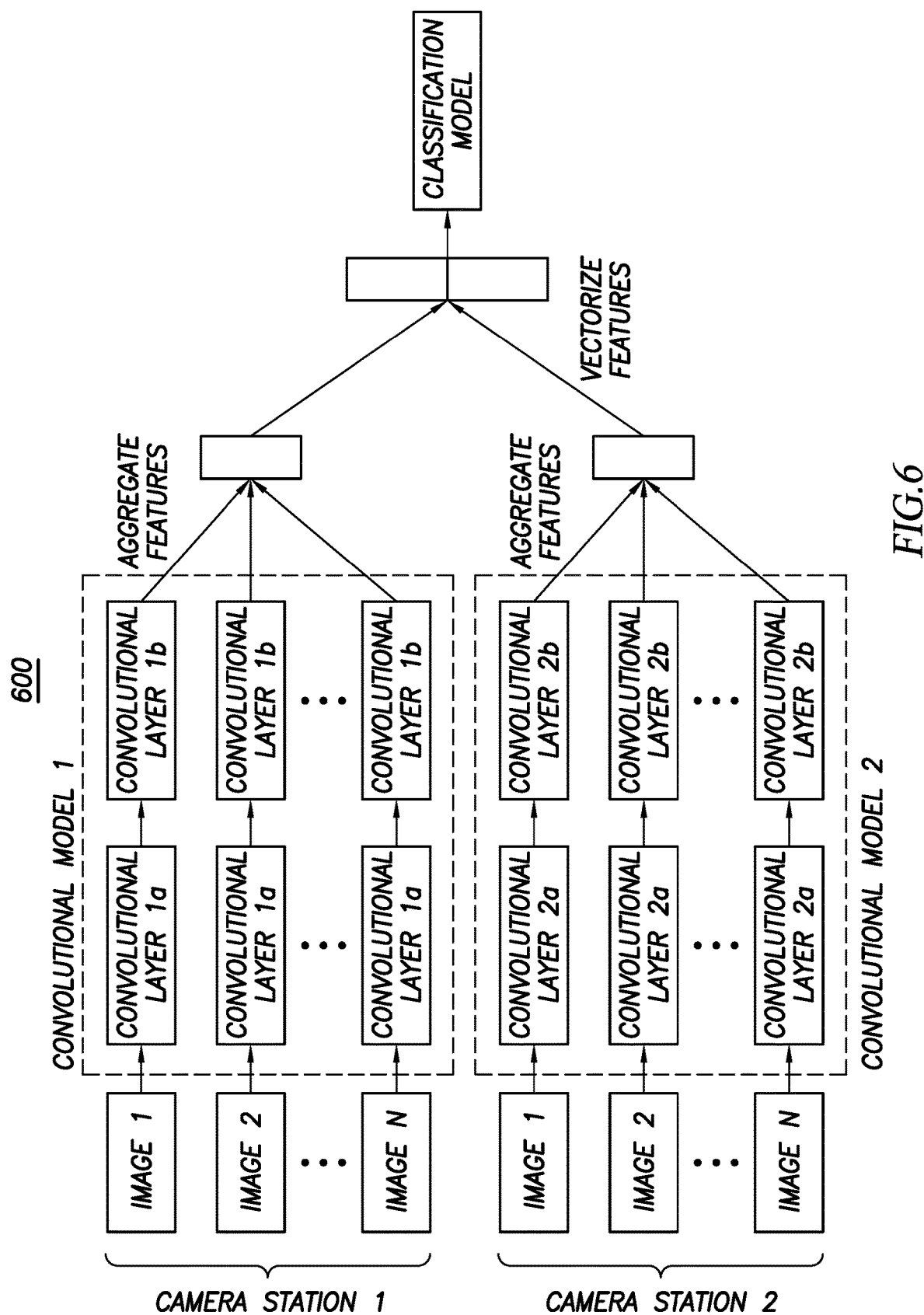
FIG. 6 illustrates an example convolutional neural network (CNN) model with multiple input images acquired from two camera stations.

As mentioned before, using conventional CNN architecture for defect detection may be ineffective. As a result, the inspection system 300 as disclosed herein may use CNN architectures based on multiple input images associated with each container of the pharmaceutical product. To begin with, the inspection system 300 may obtain a plurality of target training images using one or more optical camera sensors. The one or more optical camera sensors may capture one or more images for a selected product from one or more angles, respectively. The inspection system 300 may then divide the plurality of target training images into one or more groups of target training images. The one or more groups may be associated with the one or more camera sensors, respectively. The inspection system 300 may then generate one or more groups of feature representations for the one or more groups of target training images associated with the respective camera sensors, respectively. In other words, the same features may be extracted for images acquired from the same camera (at different angles). The inspection system 300 may then learn, based on the one or more groups of feature representations, one or more sub-models, respectively. The inspection system 300 may further integrate the one or more sub-models to generate the target machine-learning model. In particular embodiments, the target machine-learning model may be based on a convolutional neural network comprising a plurality of layers. Correspondingly, generating the one or more groups of feature representations for the one or more groups of target training images associated with the respective camera sensors, respectively may comprises the following steps. The inspection system 300 may first divide the plurality of layers into one or more groups of layers corresponding to the one or more camera sensors, respectively. The inspection system 300 may then process the one or more groups of target training images associated with the respective camera sensors by the one or more groups of layers. FIG. 6 illustrates an example convolutional neural network (CNN) model 600 with multiple input images acquired from two camera stations. The inspection system 300 may use one shared convolution model comprising one or more convolutional layers for each camera station. As displayed in FIG. 6, the images captured from the first camera station may be processed by the first group of convolutional layers, e.g., layer 1a and layer 1b. The process may result in feature representations for the images captured by the first camera station, which are further aggregated. The first group of convolutional layers may form the basis for a first sub-model of the target machine-learning model. Similar observations can be made for the images captured by the second camera station, which are processed by a second sub-model comprising a second group of convolutional layers. The process may result in feature representations for the images captured by the second camera station, which are further aggregated. The aggregated feature representations from the respective sub-models are then integrated by vectorization. Based on the finally vectorized features, the classification model, i.e., the target machine-learning model may be learned.

Model Training

Figure 7:
FIG. 7 illustrates example target training images of vials of a lyophilized protein therapeutic, Herceptin (trastuzumab).

FIG. 7 illustrates example target training images of vials 500 of a lyophilized protein therapeutic, Herceptin (trastuzumab). Herceptin may be a representative lyophilized drug product. As a typical batch of lyophilized products exhibits only a few types of defects, building a complete defect library from manufacturing rejects may take years. Defects may be artificially introduced to a pharmaceutical product vials 500, such as Herceptin, to create a library of representative defects, including different degrees of severity and locations for each defect type. While this sounds like a simple task, the creation of drug defects is made non-trivial by the sensitive drug product cake. In the case of glass defects, cracking a vial 500 by temperature shock can melt lyophilized cakes, and cracking a vial 500 by mechanical force can shrink the cake by exposure to external moisture. In the case of contamination defects, new vials 500 must be filled with a contaminant included, and the contamination must be on the surface of the ensuing product cake to be visible.

Due to the above challenges and the expensive nature of products in the biotechnology industry, limited samples of defective product vials 500 are available. 15 cc Herceptin Vials 500 (150 mg) are small and cost approximately $1500 each; 440 mg Herceptin vials 500 can cost over $4000 each. In all, 57 vials 500 were available with glass defects (cracks, scratches, and bruises), and 39 vials 500 were available with contamination (particulate matter or surface contamination). 96 non-defective vials 500 were also included in the dataset to give a total of 192 vials 500, half defective and half non-defective. For comparison purposes, the vials 500 were inspected by 10 human inspectors as a part of the routine inspection process.

Figure 8:
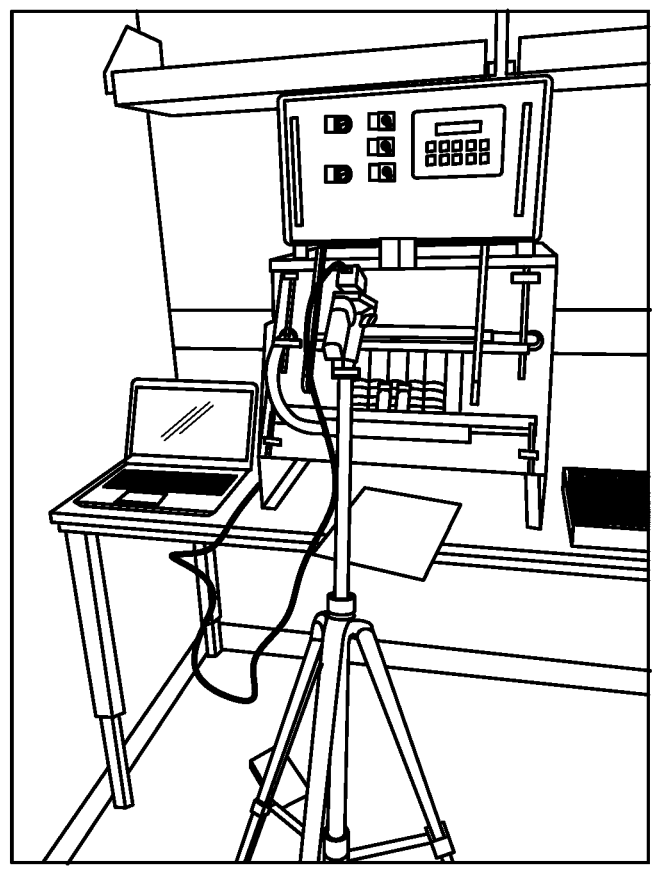
FIG. 8 illustrates an example image acquisition system.

The inspection system 300 may obtain the plurality of target training images using one or more optical camera sensors. The one or more optical camera sensors may capture one or more images for a selected product from one or more angles, respectively. When the selected product is a container of a lyophilized product, the lyophilized product may be visible inside the containers in at least one of the target training images. FIG. 8 illustrates an example image acquisition system 800. As an example and not by way of limitation, the image acquisition system 800 may comprise a tabletop SEIDENADER V 90-T. Each vial 500 in the dataset was loaded into a tabletop SEIDENADER V 90-T, which aids in the manual visual inspection of containers by rotating samples using a gear drive motor. Images may be acquired from various angles in order to inspect the full vial 500 for defects for image-based inspection. 112 images were taken of each vial 500, comprising 28 sets of 4 images spaced 90 degrees apart. The acquired images were cropped around the product vial 400 and compressed to a resolution of 460×160 pixels.

In particular embodiments, model architectures may be created based on the open source code and the models may be trained using the open source backend. Training a CNN may represent a supervised machine-learning problem, in which the machine attempts to learn rules for classifying new images given a set of images and their respective labels. To train a CNN model to differentiate images of defective vials 500 from those of normal vials 500, the algorithm may be shown many images of defective vials 500 and many of normal vials 500, with the goal of learning a model that can best predict the category of a new image. "Learning a model" may refer to computing values for the millions of weights/parameters involved in a CNN for the given classification problem. The weights/parameters may include those of the convolutional layers and the fully connected layers. An objective function or loss function may be defined to quantify the model performance for training. Cross-entropy may be selected as the loss function for classification. As an example and not by way of limitation, the loss function may be denoted as $$\text{Loss} = -\sum_{i=1}^{N}\sum_{c=1}^{C} \ell(y=c)\ln(P(y=c)).$$

N may indicate the number of samples. C may indicate the number of possible classes. $\ell$ (y=c) may be an indicator function representing whether sample i is in class c. P(y=c) may be predicted probability that sample i is in class c. The loss function may be defined to increase as the model error increases and a gradient-based optimization algorithm may be employed to iteratively reduce the loss function. To properly adjust the model weights at each iteration, the algorithm may compute the gradient of the loss function to each model weight. The weight vector may then be adjusted in the opposite direction of the gradient vector, in a manner that differs by algorithm.

The training of ANNs and CNNs may be based on stochastic gradient descent (SGD). The main principle may comprise computing the loss function using only a few examples, finding the associated gradients (using back-propagation), and adjusting the weights according to the average gradient. To prevent over-fitting the training data or a particular batch, regularization may be employed, penalizing high neuron weights. An additional strategy may comprise dropout, wherein a proportion of nodes are randomly excluded from the neural network during training. This exclusion may ensure that the bulk of classification power comes from the aggregation of nodes, instead of being dominated by a few nodes. It is important that a set of data, called test data, be left out of the training examples. The final model may be tested on the test data to measure the generalization ability of the learned model.

As mentioned above, it is difficult to acquire sufficient samples of defective product vials 500. As a result, the inspection system 300 may leverage transfer-learning to address the challenge of the paucity of defect data to train with. As disclosed herein, training a target machine-learning model based on an auxiliary machine-learning model may be referred to as transfer-learning. Conventional deep CNNs may learn features similar to Gabor filters and color blobs in their first-layer. Lower-level features such as these tend to be general features that are applicable to many datasets and tasks, in contrast to higher-level features that tend to be very specific to their trained task. Due to this property, the size of datasets required to train CNNs with good generalization ability may be significantly decreased using transfer learning. Transfer learning refers to training a "base"/"auxiliary" CNN on a first/auxiliary dataset and task and later transferring the learned features to a second "target" dataset and task. This procedure has been demonstrated to enable training a large CNN on a target dataset without over-fitting by using a significantly larger base/auxiliary dataset. Moreover, prior research has reported that model generalization ability is greatly increased by transfer learning (compared to random initialization) even in the case where the base/auxiliary and target datasets are very dissimilar.

In particular embodiments, the inspection system 300 may use transfer learning by training the base/auxiliary CNN and using the learned weights from the bottom n layers as the first n layers of the target CNN. The standard optimization procedure may be then applied to learn the remaining layers of the target network, starting from a random initialization. During the learning procedure, the weights of the transferred layers may be held constant or "frozen". As an example not by way of limitation, the model in FIG. 4 may be trained using convolutional model learned from a different task, leaving only the classification model to be trained. After the high-level features are trained, all of the model parameters may be further improved, which is a process known as fine-tuning.

Figure 9:
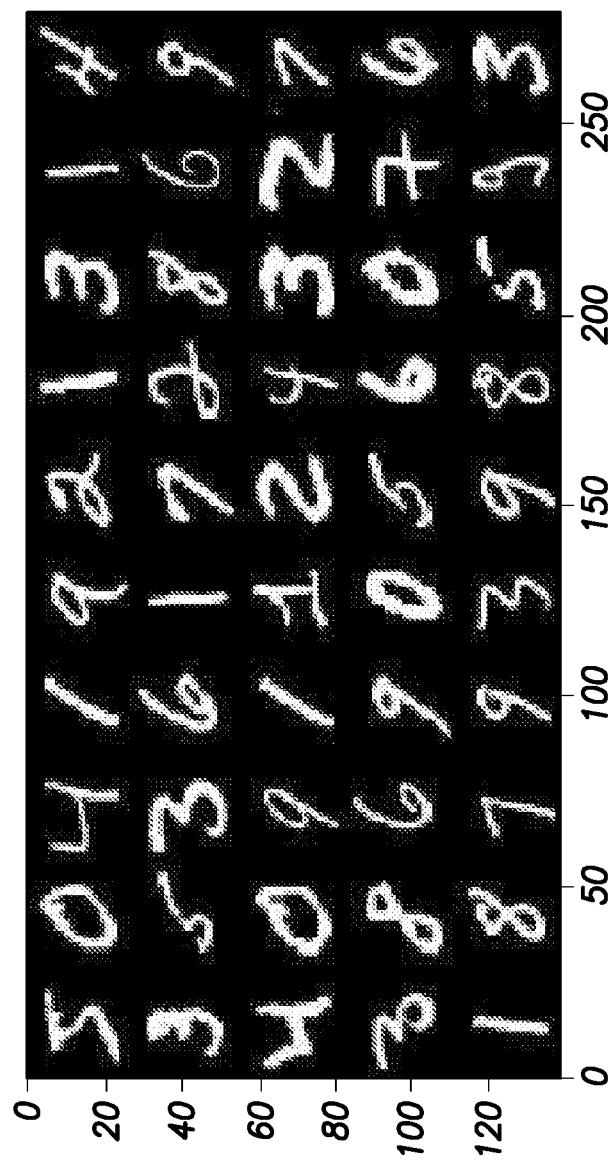
FIG. 9 illustrates example images of the MNIST dataset.

The auxiliary machine-learning model may be trained based on a plurality of auxiliary training samples comprising a plurality of auxiliary training images and a plurality of content categories associated with the plurality of auxiliary training images, respectively. The plurality of content categories associated with the plurality of auxiliary training images may not match the plurality of defect indications associated with the plurality of target training images. As an example and not by way of limitation, the plurality of content categories may comprise a plurality of handwritten numeric digits. For example, a base/auxiliary machine-learning model with the same model architecture may be trained on the MNIST dataset. The MNIST dataset is a public dataset comprising 70,000 handwritten digits belonging to 10 classes. FIG. 9 illustrates example images of the MNIST dataset 900. As can be seen from FIG. 9, classification of the digits in the MNIST dataset is a very different task than the target task of classifying lyophilized product vials 500.

To summarize, the inspection system 300 may use the following process to train the target machine-learning model based on transfer learning. The inspection system 300 may first accessing a plurality of target training samples. The target training samples may comprise a plurality of target training images associated with containers of the pharmaceutical product and a plurality of defect indications associated with the plurality of target training images, respectively. The inspection system 300 may then select a plurality of auxiliary training samples based on the target training samples. The auxiliary training samples may comprise a plurality of auxiliary training images and a plurality of content categories associated with the plurality of auxiliary training images, respectively. The inspection system 300 may then train the target machine-learning model. The training may comprise training an auxiliary machine-learning model based on the plurality of auxiliary training samples, generating feature representations of the plurality of target training images based on the auxiliary machine-learning model, and learning, based on the generated feature representations and the plurality of defect indications, a relationship between the feature representations of the plurality of target training images and the plurality of defect indications.

Example Inspection of Glass Defect

Figure 10:
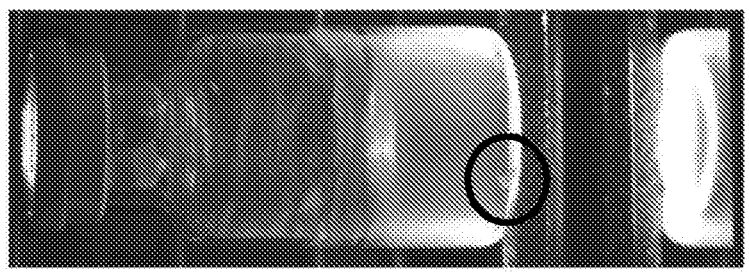
FIG. 10 illustrates examples of glass defects including scratches in comparison with fogging on glass.
Figure 10:
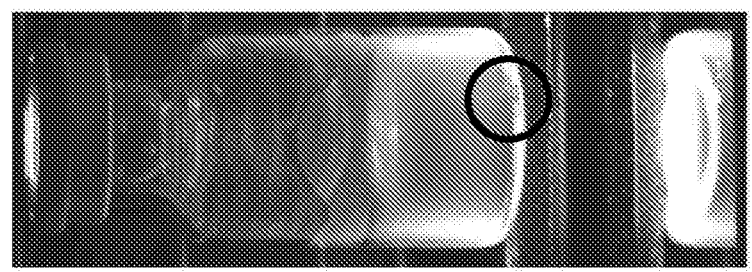
Figure 10:
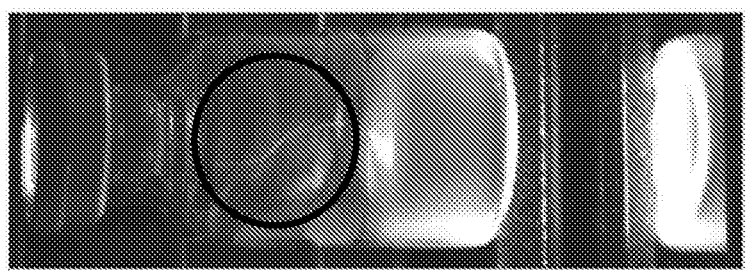
Figure 10:
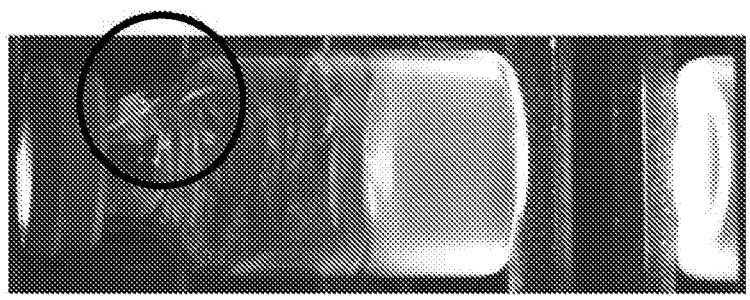
Figure 10:
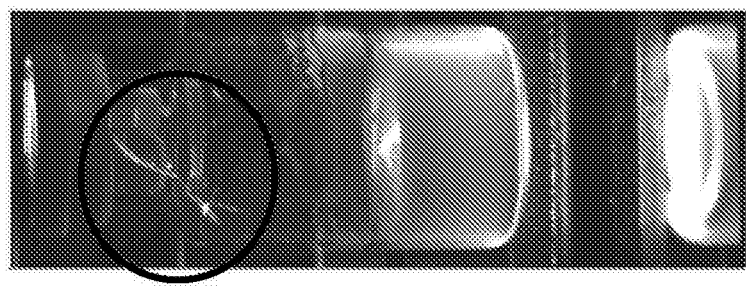
Figure 11:
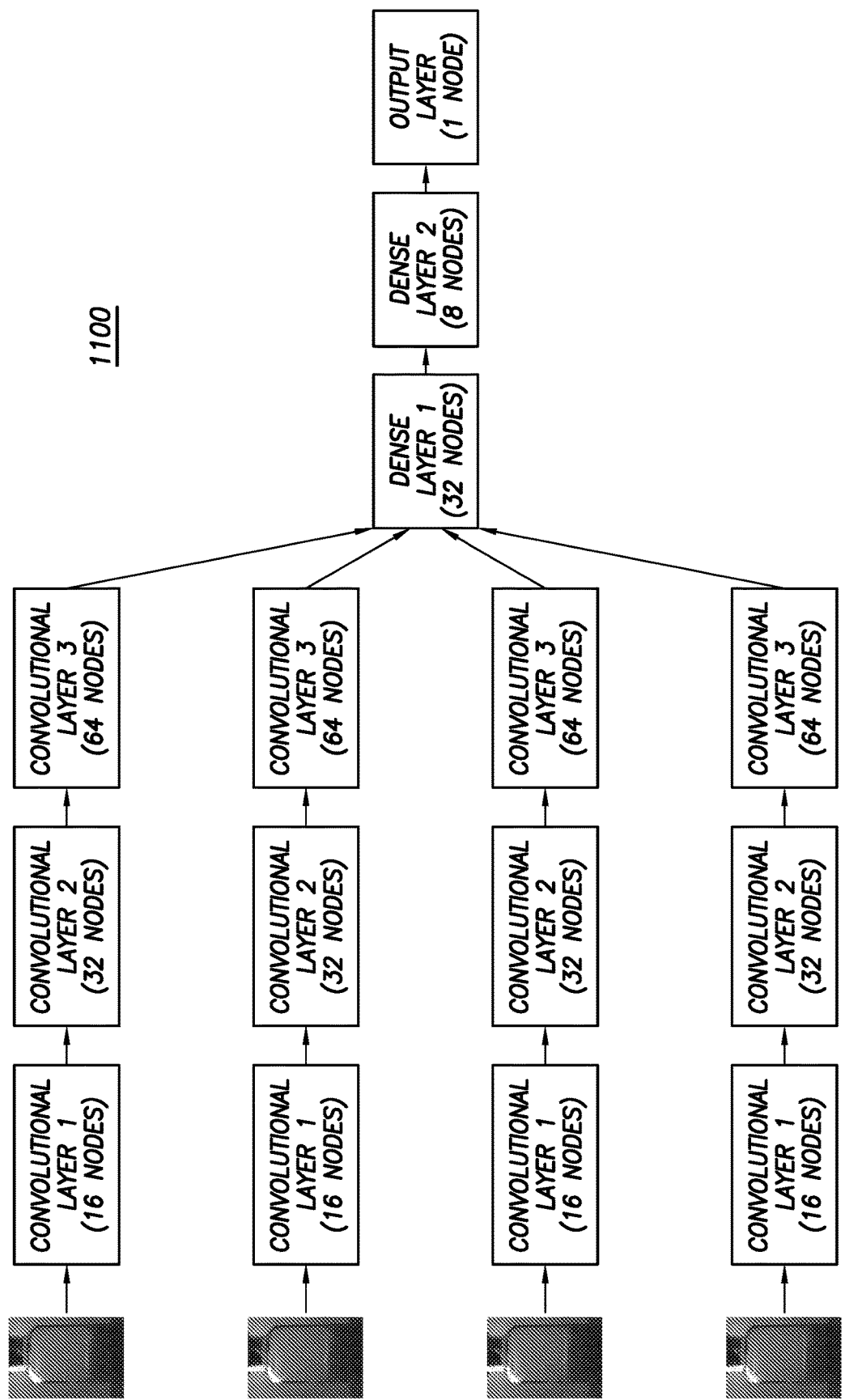
FIG. 11 illustrates an example CNN architecture used for binary classification of glass defect.

The performance of the inspection system 300 was tested through a binary classification task to investigate the ability of CNNs to detect glass defects with high accuracy, even with small target training data sets. FIG. 10 illustrates example of glass defects including scratches in comparison with fogging on glass. As displayed in FIG. 10, the left three vials 500 have scratches which are circled. In comparison, the right two vials 500 have fogging on glass, which are circled. The comparison shows that scratches are difficult to detect, which may cause the most errors for automatic inspection. As an example and not by way of limitation, up to 90% false reject rate may happen for other existing automatic inspection approaches when there is fogging on glass. The data were divided into samples of four images each, on which a CNN with multiple inputs was trained. FIG. 11 illustrates an example CNN architecture 1100 used for binary classification of glass defect. As displayed in FIG. 11, there may be four input images, representing images of the vial 500 spaced 90 degrees apart. The target machine-learning model may comprise 1,834,417 trainable parameters. There were 2550 samples (of four images each) used as training data and 300 samples used as validation data. The samples from validation data are acquired from product vials 500 not present in the target training dataset, which may better test model generalization power. Cross-entropy was selected as the loss function and stochastic gradient descent was used to train the CNN with a batch size of 30. Both L1-norm and L2-norm regularization terms were included with weights of 0.001.

Figure 12:
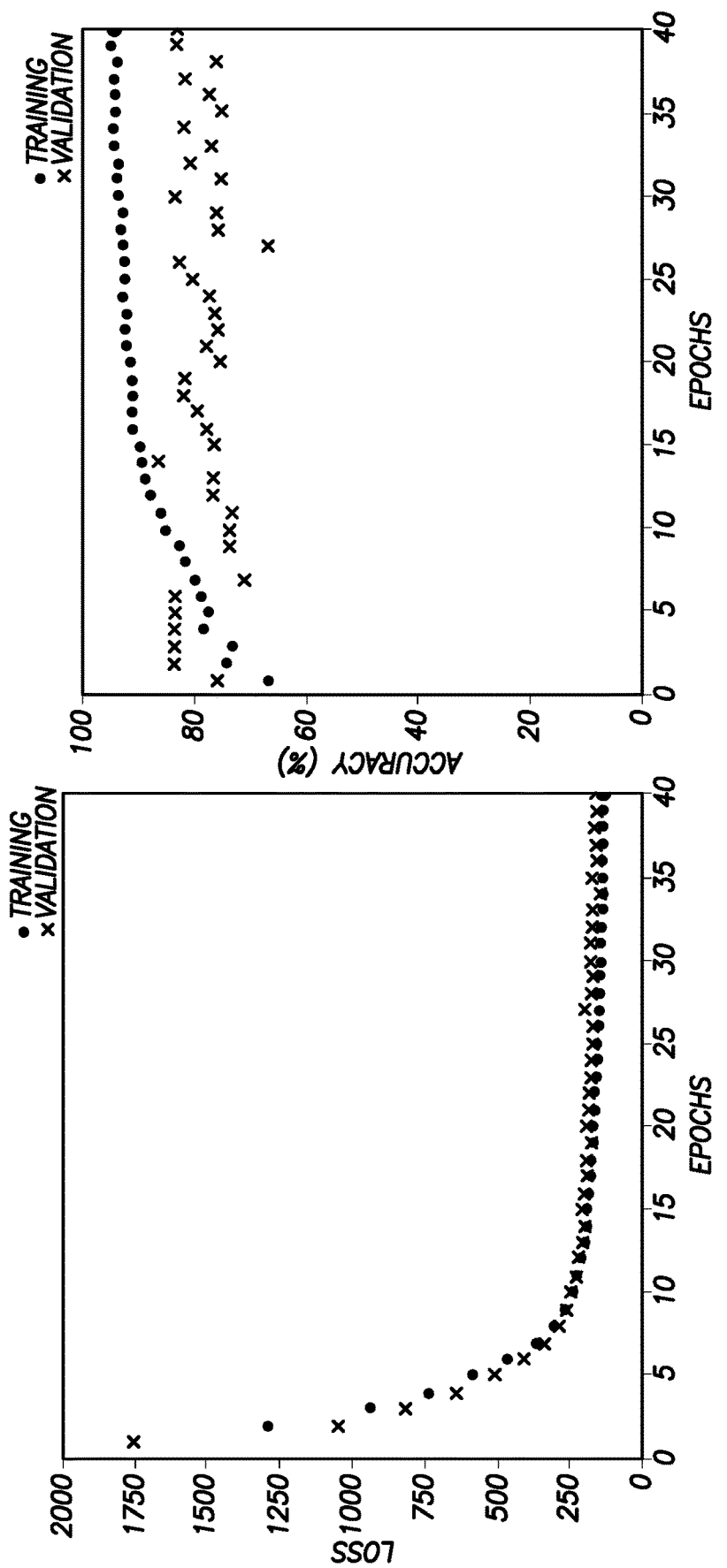
FIG. 12 illustrates an example loss and accuracy of the target machine-learning model trained for binary classification of glass defect from random weights.

FIG. 12 illustrates an example loss and accuracy of the target machine-learning model trained for binary classification of glass defect from random weights. As displayed in FIG. 12, the loss and accuracy found in training the model are associated with 40 epochs. FIG. 12 shows that the loss decreases smoothly in both the target training and validation data, suggesting that adequate hyperparameters are selected for the optimization procedure. However, the accuracy level is very different between the two. In particular, accuracy in classifying the validation data plateaus around 83%, while accuracy on the target training data increases to approximately 95%. The difference in the two accuracy levels may indicate that the model is over-fitting the target training data and is not generalizable to new data.

Figure 13:
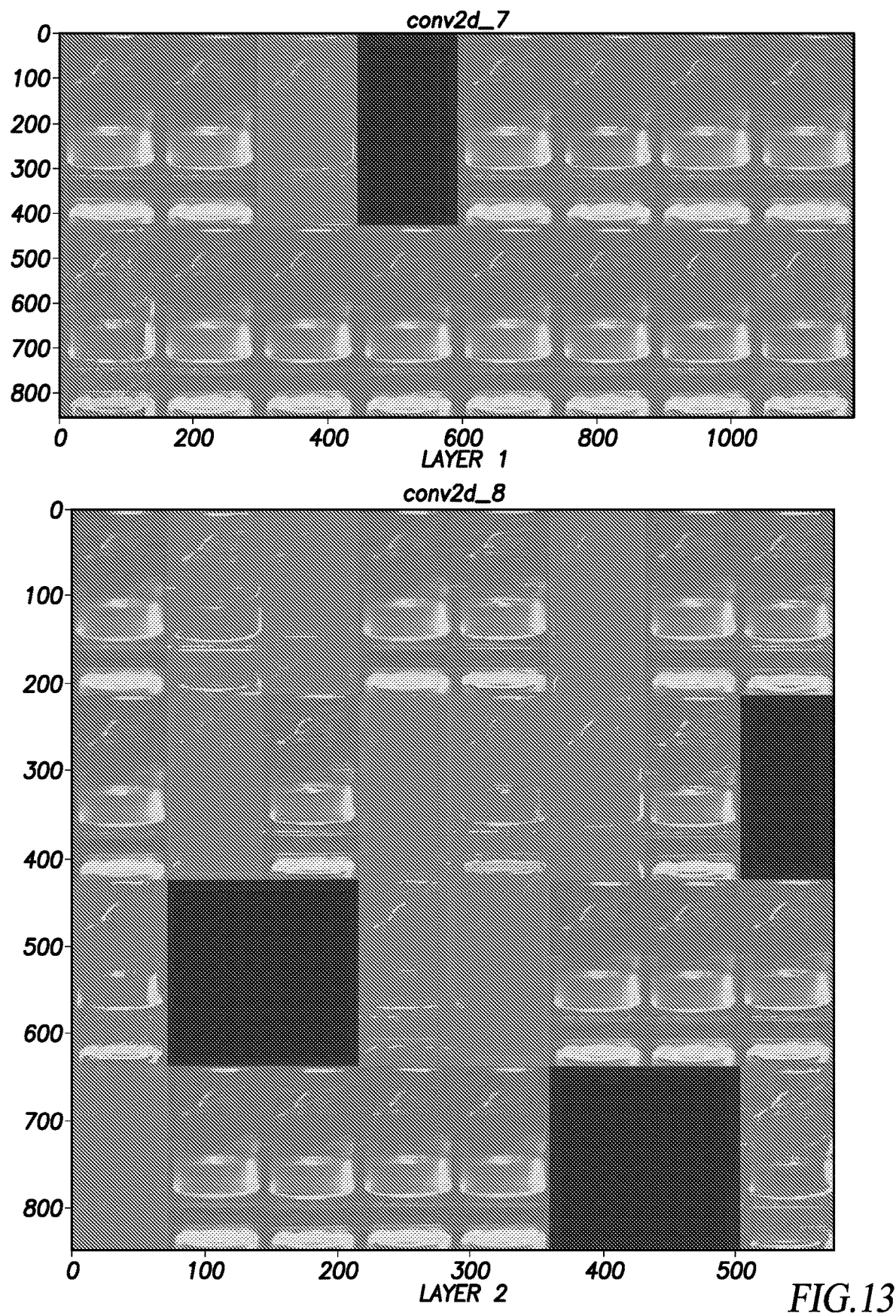
FIG. 13 illustrates an example visualization of the activation functions of CNNs for binary classification of glass defect.

FIG. 13 illustrates an example visualization of the activation functions of CNNs for binary classification of glass defect. Plotting the output of the activation function of each node may reveal the locations in a sample image where the node has found its learned feature. As a result, such plots may allow inference of the learned features of each node. As displayed in FIG. 13, the activation functions from the 16 first-layer nodes (top) and 32 second-layer nodes (bottom) of the learned model. As can be seen from FIG. 13, there are a few noticeable "dead" nodes, where the nodes are never activated. This is a common phenomenon in training CNNs with stochastic gradient descent, and prior research suggests that up to 50% of the nodes can be dead. In particular embodiments, most of the feature extraction may occur in just a few nodes, with most of the other nodes simply passing the image through unprocessed. This is apparent especially in the first-layer nodes (top sub-figure of FIG. 13), where most node outputs are nearly identical to the original image.

Figure 14:
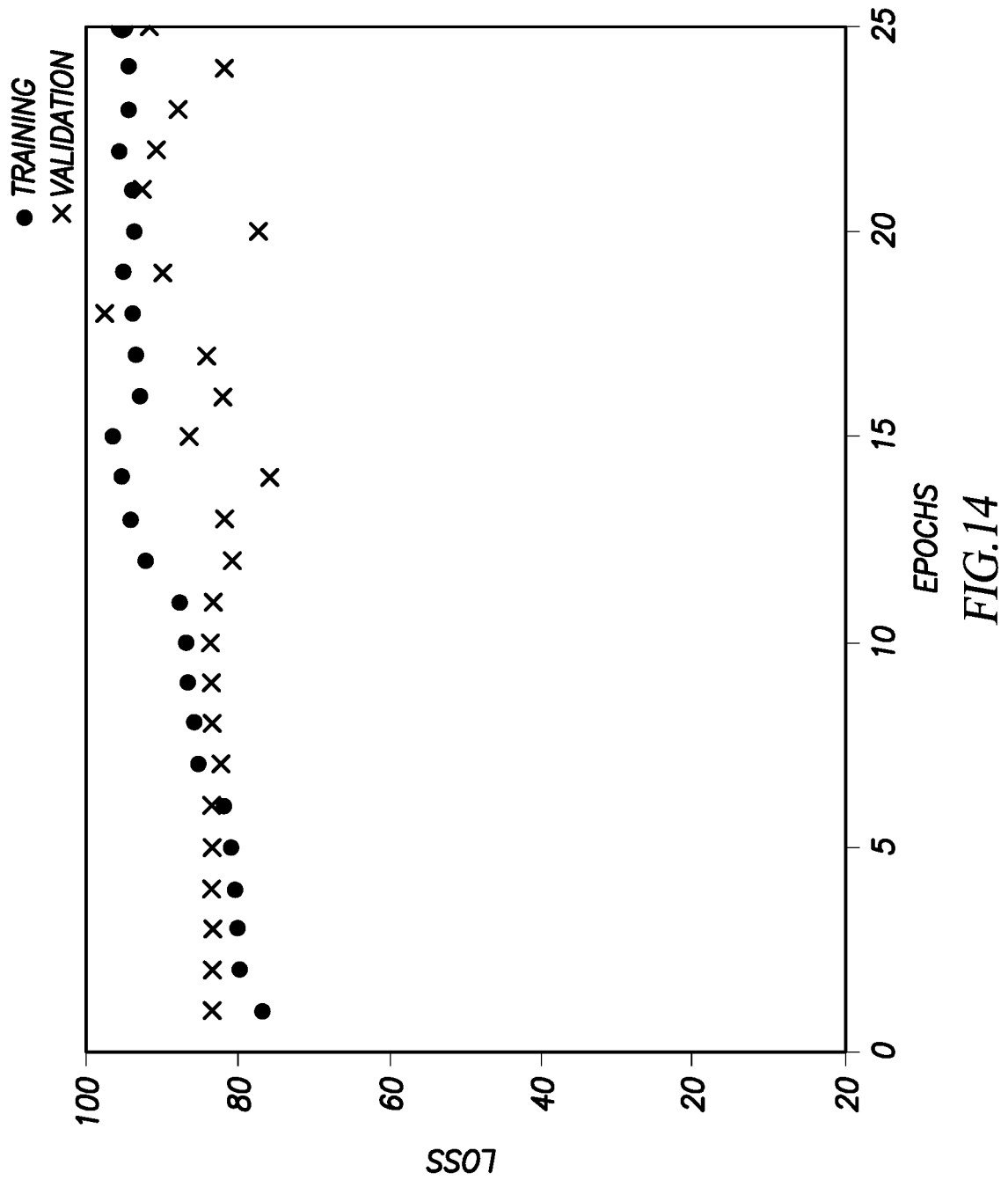
FIG. 14 illustrates example accuracy levels of the target machine-learning model for binary classification of glass defect when training the classification layers based on transfer learning.

FIG. 14 illustrates example accuracy levels of the target machine-learning model for binary classification of glass defect when training the classification layers based on transfer learning. The transfer learning is based on the MNIST dataset. Three convolutional layers learned from training on the MNIST dataset were frozen, and the fully connected classification layers were trained. Regularization weights were not used, and the same optimization algorithm and batch size were used. The accuracy levels are associated with 25 epochs. As can be seen in FIG. 14, the classification accuracy on target training data is relatively unaltered, even though the lower-level features are learned from the MNIST dataset. This may indicate that the lower-level features are general and can still be used to learn a good classifier on a very different task. In addition, the classification accuracy on validation data is much higher with transfer learning, indicating that the model is able to generalize better.

Figure 15:
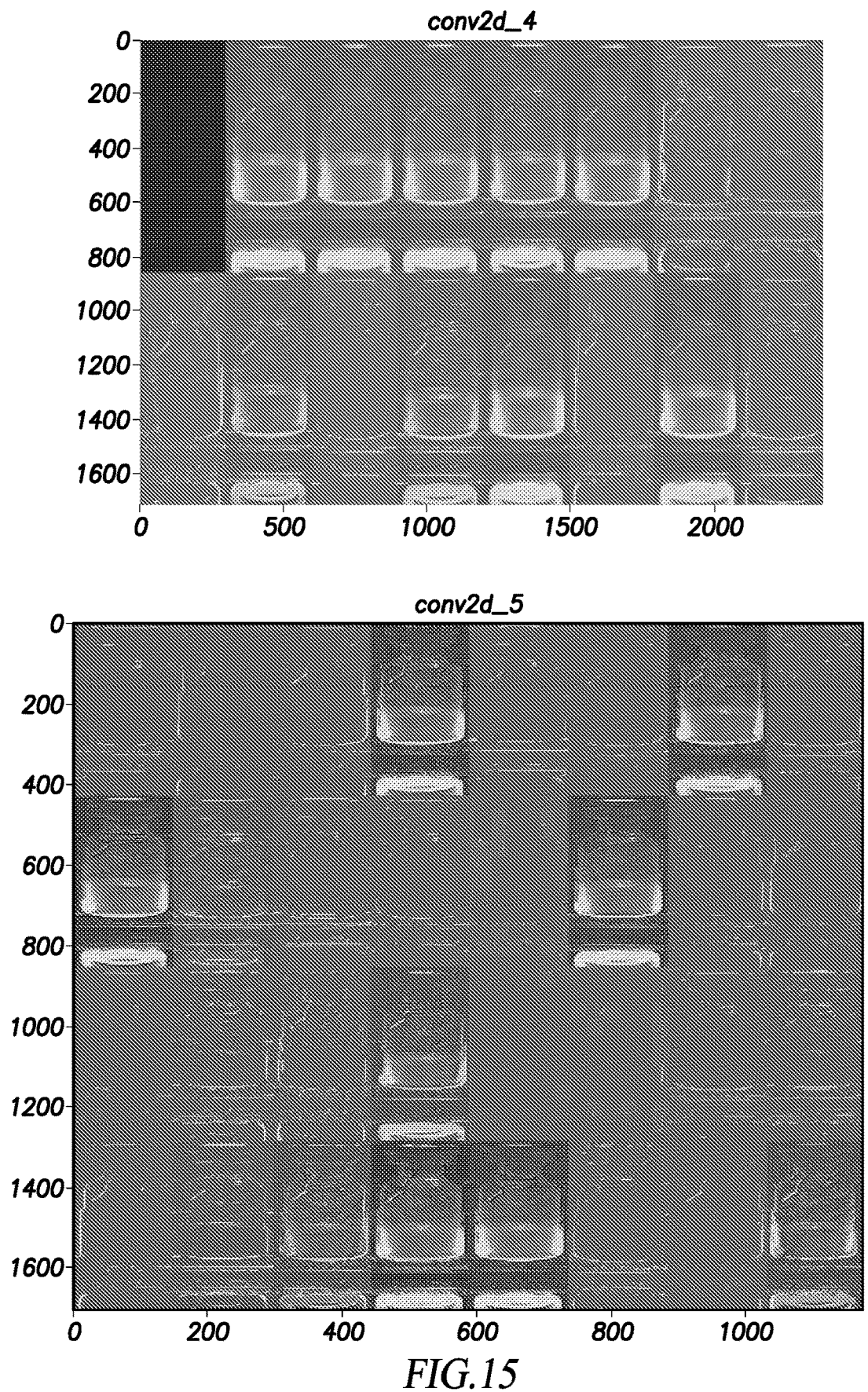
FIG. 15 illustrates an example visualization of activation functions of CNNs for binary classification of glass defect when using transfer learning.

FIG. 15 illustrates an example visualization of activation functions of CNNs for binary classification of glass defect when using transfer learning. In particular, the left part shows the first-layer nodes of the CNN learned with transfer learning whereas the right part shows the second-layer nodes of the CNN learned with transfer learning. As can be seen in FIG. 15, the new CNN has fewer "dead" nodes, including none in the second layer. More features are noticeably extracted, compared to the previous model where many nodes simply output the same input image. The layers learned on the MNIST dataset and applied to the target task may be reminiscent of Canny edge detectors and other standard image-processing techniques. Such basic image motifs may be general to all images, which may be likely the main reason for the improvement in model generalization ability.

Figure 16:
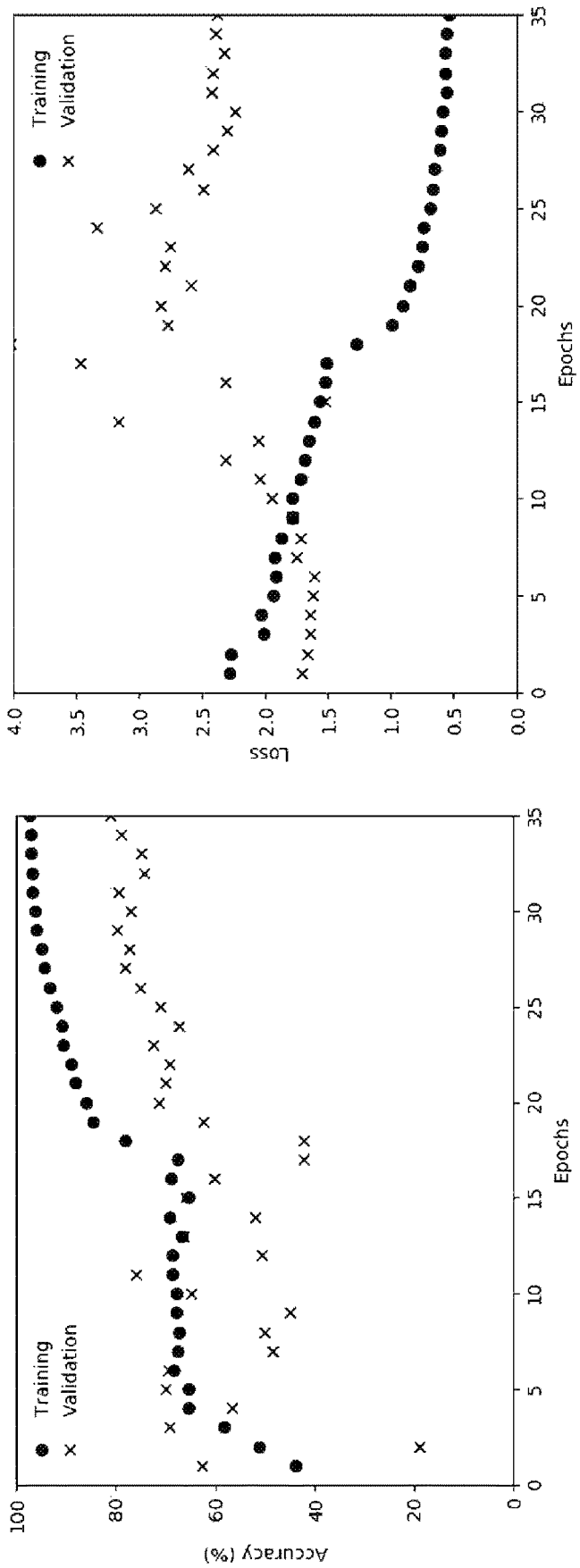
FIG. 16 illustrates an example accuracy and loss of the target machine-learning model trained for multi-class classification.

FIG. 16 illustrates an example accuracy and loss of the target machine-learning model trained for multi-class classification. The same target machine-learning model was trained for multi-class classification on a dataset partitioned into three classes. The three classes include non-defective, glass defects, and contamination. The accuracy levels from training the classification layers through 35 epochs are shown in FIG. 16 on the left. The loss is shown in FIG. 16 on the right. It can be seen that the lost on the training data decreases, reaches a plateau, and then sharply decreases again. This behavior may be attributed to the stochastic method used to regress the parameters of the neural network model. The training accuracy and loss function do not reflect the model performance on the validation data. The validation loss stops decreasing after approximately 6 epochs (~60% accuracy), after which point the model is overfit to the training data. This may suggest that significantly more training data is required in order to fit a three-class model generalizable to new data.

The performance of the target machine-learning model is further validated by the reject rate. According to the experiments, the reject rate is variable depending on the threshold set up in the classification. More specifically, the results from the binary classification will be the probability of glass defect range from 0 to 1. Hence, the threshold may be used to balance between the ejecting rate and reject rate. Based on the current results, the reject rate is less than 8% assuming the actual defect rate varies from 0.02% to 0.2%. Compared to the original number (around 80%), it has been improved significantly by the target machine-learning model.

Systems and Methods

Figure 17:
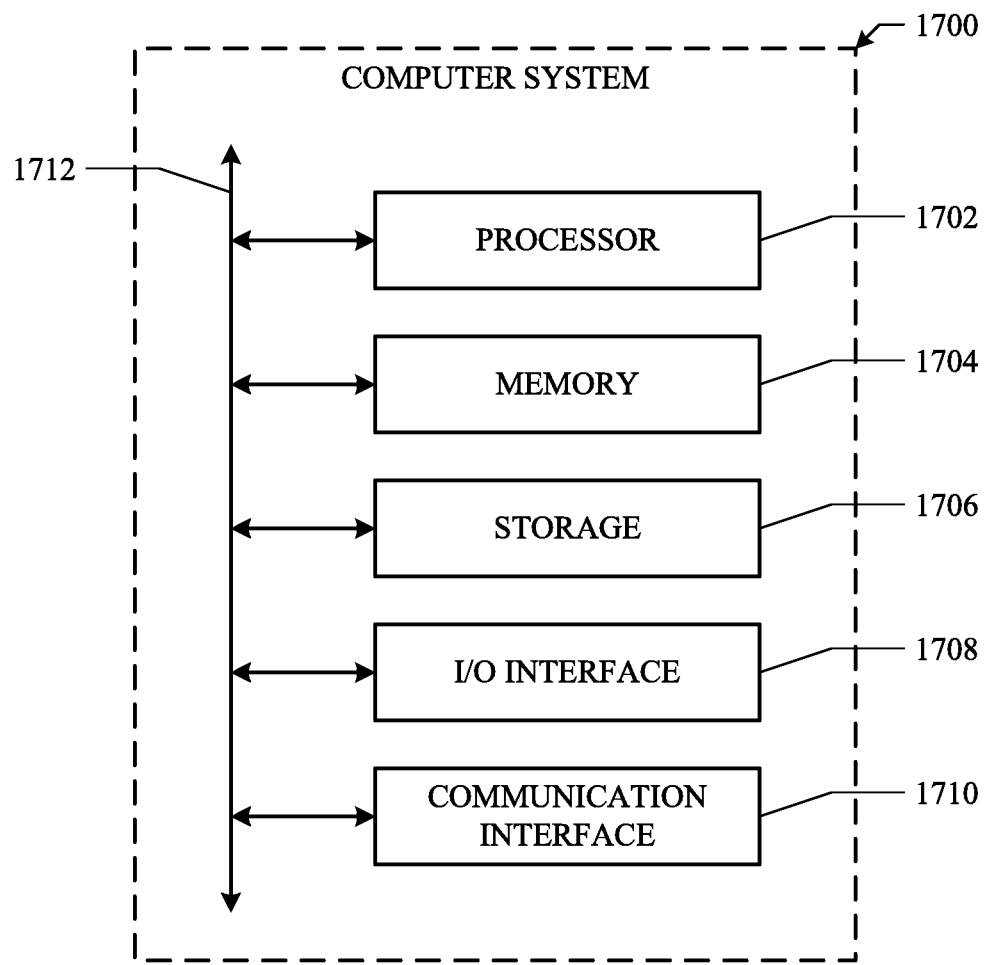
FIG. 17 illustrates an example of a computing system.

FIG. 17 illustrates an example computer system 1700. In particular embodiments, one or more computer systems 1700 perform one or more steps of one or more methods described or illustrated herein. In particular embodiments, one or more computer systems 1700 provide functionality described or illustrated herein. In particular embodiments, software running on one or more computer systems 1700 performs one or more steps of one or more methods described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1702, memory 1704, storage 1706, an input/output (I/O) interface 1708, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702. Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706; or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere). One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1708 for them. Where appropriate, I/O interface 1708 may include one or more device or software drivers enabling processor 1702 to drive one or more of these I/O devices. I/O interface 1708 may include one or more I/O interfaces 1708, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1710 for it. As an example and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system: receiving one or more querying images associated with a container of a pharmaceutical product, wherein each of the one or more querying images is based on a particular angle for capturing an image of the container of the pharmaceutical product, wherein the pharmaceutical product comprises a lyophilized product associated with one or more product-attributes, and wherein each of the product-attributes is one of a physical form factor, a color, a level of transparency, viscosity, or a fill volume;

calculating, for the container of the pharmaceutical product depicted in the one or more querying images, one or more confidence scores associated with one or more defect indications, respectively, by processing the one or more querying images using a target machine-learning model; and determining, for the container of the pharmaceutical product depicted in the one or more querying images, a defect indication from the one or more defect indications based on a comparison between the one or more confidence scores and one or more predefined threshold scores, respectively.

2. The method of claim 1, wherein calculating the one or more confidence scores associated with the one or more defect indications for the one or more querying images comprises:

generating one or more feature representations of the one or more querying images by processing the one or more querying images using the target machine-learning model; and calculating the one or more confidence scores associated with the one or more defect indications based on one or more of:

a relationship between feature representations of a plurality of target training images and the plurality of defect indications; or the generated one or more feature representations of the one or more querying images.

3. The method of claim 1, further comprising:

obtaining the one or more querying images using one or more optical camera sensors, wherein the one or more optical camera sensors capture the one or more querying images for the container of the pharmaceutical product from one or more angles, respectively.

4. The method of claim 1, wherein the container comprises one or more of a cap, a seal, a stopper, a neck, a shoulder, a body, or a base.

5. The method of claim 1, wherein the defect indication comprises one or more of a critical defect, a major defect, or a minor defect.

6. The method of claim 5, wherein the pharmaceutical product comprises a lyophilized product, and wherein the critical defect comprises one or more of a cake appearance defect or a fill volume defect.

7. The method of claim 6, wherein the cake appearance defect comprises one or more of a meltback, an extreme shrunken cake, an un-lyophilized cake, or a discoloration.

8. The method of claim 5, wherein the pharmaceutical product comprises a lyophilized product, and wherein the major defect comprises a cake appearance defect, the cake appearance defect comprising one or more of an extreme product splash, a slanted cake, or a shrunken cake.

9. The method of claim 1, wherein the target machine-learning model is based on a convolutional neural network.

10. The method of claim 1, wherein each of the one or more predefined threshold scores is determined based on an acceptance quality limit associated with the defect indication.

11. The method of claim 1, further comprising:

accessing a plurality of target training samples, the target training samples comprising a plurality of target training images associated with containers of the pharmaceutical product and a plurality of defect indications associated with the plurality of target training images, respectively;

selecting a plurality of auxiliary training samples based on the target training samples, the auxiliary training samples comprising a plurality of auxiliary training images and a plurality of content categories associated with the plurality of auxiliary training images, respectively; and training the target machine-learning model, the training comprising:

training an auxiliary machine-learning model based on the plurality of auxiliary training samples;

generating feature representations of the plurality of target training images based on the auxiliary machine-learning model; and learning, based on the generated feature representations and the plurality of defect indications, a relationship between the feature representations of the plurality of target training images and the plurality of defect indications.

12. The method of claim 11, wherein the pharmaceutical product comprises a lyophilized product, and wherein the lyophilized product is visible inside the containers in at least one of the target training images.

13. The method of claim 11, further comprising:

obtaining the plurality of target training images using one or more optical camera sensors, wherein the one or more optical camera sensors capture one or more images for a selected product from one or more angles, respectively.

14. The method of claim 13, further comprising:

dividing the plurality of target training images into one or more groups of target training images, the one or more groups being associated with the one or more camera sensors, respectively.

15. The method of claim 14, wherein training the target machine-learning model further comprises:

generating one or more groups of feature representations for the one or more groups of target training images associated with the respective camera sensors, respectively;

learning, based on the one or more groups of feature representations, one or more sub-models, respectively; and integrating the one or more sub-models to generate the target machine-learning model.

16. The method of claim 15, wherein the target machine-learning model is based on a convolutional neural network comprising a plurality of layers, and wherein generating the one or more groups of feature representations, comprises:

dividing the plurality of layers into one or more groups of layers corresponding to the one or more camera sensors, respectively; and processing the one or more groups of target training images associated with the respective camera sensors by the one or more groups of layers.

17. The method of claim 11, wherein the plurality of content categories comprises a plurality of handwritten numeric digits.

18. The method of claim 11, wherein the plurality of content categories associated with the plurality of auxiliary training images do not match the plurality of defect indications associated with the plurality of target training images.

19. One or more computer-readable non-transitory storage media embodying software that is operable when executed to:

receive one or more querying images associated with a container of a pharmaceutical product, wherein each of the one or more querying images is based on a particular viewpoint of the container of the pharmaceutical product, wherein the pharmaceutical product comprises a lyophilized product associated with one or more product-attributes, and wherein each of the product-attributes is one of a physical form factor, a color, a level of transparency, viscosity, or a fill volume;

calculate, for the container of the pharmaceutical product depicted in the one or more querying images, one or more confidence scores associated with one or more defect indications, respectively, by processing the one or more querying images using a target machine-learning model; and determine, for the container of the pharmaceutical product depicted in the one or more querying images, a defect indication from the one or more defect indications based on a comparison between the one or more confidence scores and one or more predefined threshold scores, respectively.

20. The computer-readable non-transitory storage media of claim 19, wherein the software that is operable when executed to calculate the one or more confidence scores associated with the one or more defect indications for the one or more querying images comprises software that is operable when executed to:

generate one or more feature representations of the one or more querying images by processing the one or more querying images using the target machine-learning model; and calculate the one or more confidence scores associated with the one or more defect indications based on one or more of:
  a relationship between feature representations of a plurality of target training images and the plurality of defect indications; or
  the generated one or more feature representations of the one or more querying images.

21. The computer-readable non-transitory storage media of claim 19, further comprising software that is operable when executed to:

obtain the one or more querying images using one or more optical camera sensors, wherein the one or more optical camera sensors capture the one or more querying images for the container of the pharmaceutical product from one or more angles, respectively.

22. The computer-readable non-transitory storage media of claim 19, wherein the container comprises one or more of a cap, a seal, a stopper, a neck, a shoulder, a body, or a base.

23. The computer-readable non-transitory storage media of claim 19, wherein the defect indication comprises one or more of a critical defect, a major defect, or a minor defect.

24. The computer-readable non-transitory storage media of claim 23, wherein the pharmaceutical product comprises a lyophilized product, and wherein the critical defect comprises one or more of a cake appearance defect or a fill volume defect.

25. The computer-readable non-transitory storage media of claim 24, wherein the cake appearance defect comprises one or more of a meltback, an extreme shrunken cake, an un-lyophilized cake, or a discoloration.

26. The computer-readable non-transitory storage media of claim 23, wherein the pharmaceutical product comprises a lyophilized product, and wherein the major defect comprises a cake appearance defect, the cake appearance defect comprising one or more of an extreme product splash, a slanted cake, or a shrunken cake.

27. The computer-readable non-transitory storage media of claim 19, wherein the target machine-learning model is based on a convolutional neural network.

28. The computer-readable non-transitory storage media of claim 19, wherein each of the one or more predefined threshold scores is determined based on an acceptance quality limit associated with the defect indication.

29. The computer-readable non-transitory storage media of claim 19, further comprising software that is operable when executed to:

access a plurality of target training samples, the target training samples comprising a plurality of target training images associated with containers of the pharmaceutical product and a plurality of defect indications associated with the plurality of target training images, respectively;

select a plurality of auxiliary training samples based on the target training samples, the auxiliary training samples comprising a plurality of auxiliary training images and a plurality of content categories associated with the plurality of auxiliary training images, respectively; and train the target machine-learning model, the training comprising:
  train an auxiliary machine-learning model based on the plurality of auxiliary training samples;
  generate feature representations of the plurality of target training images based on the auxiliary machine-learning model; and
  learn, based on the generated feature representations and the plurality of defect indications, a relationship between the feature representations of the plurality of target training images and the plurality of defect indications.

30. The computer-readable non-transitory storage media of claim 29, wherein the pharmaceutical product comprises a lyophilized product, and wherein the lyophilized product is visible inside the containers in at least one of the target training images.

31. The computer-readable non-transitory storage media of claim 29, further comprising software that is operable when executed to:

obtain the plurality of target training images using one or more optical camera sensors, wherein the one or more optical camera sensors capture one or more images for a selected product from one or more angles, respectively.

32. The computer-readable non-transitory storage media of claim 31, further comprising software that is operable when executed to:

divide the plurality of target training images into one or more groups of target training images, the one or more groups being associated with the one or more camera sensors, respectively.

33. The computer-readable non-transitory storage media of claim 32, wherein the software that is operable when executed to train the target machine-learning model further comprises software that is operable when executed to:

generate one or more groups of feature representations for the one or more groups of target training images associated with the respective camera sensors, respectively;

learn, based on the one or more groups of feature representations, one or more sub-models, respectively; and integrate the one or more sub-models to generate the target machine-learning model.

34. The computer-readable non-transitory storage media of claim 33, wherein the target machine-learning model is based on a convolutional neural network comprising a plurality of layers, and wherein the software that is operable when executed to generate the one or more groups of feature representations comprises software that is operable when executed to:
divide the plurality of layers into one or more groups of layers corresponding to the one or more camera sensors, respectively; and
process the one or more groups of target training images associated with the respective camera sensors by the one or more groups of layers.

35. The computer-readable non-transitory storage media of claim 29, wherein the plurality of content categories comprises a plurality of handwritten numeric digits.

36. The computer-readable non-transitory storage media of claim 29, wherein the plurality of content categories associated with the plurality of auxiliary training images do not match the plurality of defect indications associated with the plurality of target training images.

37. An apparatus comprising:
one or more cameras, wherein each camera corresponds to a different angle of view;
one or more sensors;
one or more lights;
one or more trays;
one or more height controls;
one or more processors; and
a non-transitory memory coupled to the processors comprising instructions executable by the processors, the processors operable when executing the instructions to:
receive one or more querying images associated with a container of a pharmaceutical product, wherein each of the one or more querying images is based on a particular viewpoint of the container of the pharmaceutical product, wherein the pharmaceutical product comprises a lyophilized product associated with one or more product-attributes, and wherein each of the product-attributes is one of a physical form factor, a color, a level of transparency, viscosity, or a fill volume;
calculate, for the container of the pharmaceutical product depicted in the one or more querying images, one or more confidence scores associated with one or more defect indications, respectively, by processing the one or more querying images using a target machine-learning model; and
determine, for the container of the pharmaceutical product depicted in the one or more querying images, a defect indication from the one or more defect indications based on a comparison between the one or more confidence scores and one or more predefined threshold scores, respectively.

38. The apparatus of claim 37, wherein the processors operable when executing the instructions to calculate the one or more confidence scores associated with the one or more defect indications for the one or more querying images comprises software that is operable when executed to:
generate one or more feature representations of the one or more querying images by processing the one or more querying images using the target machine-learning model; and
calculate the one or more confidence scores associated with the one or more defect indications based on one or more of:
a relationship between feature representations of a plurality of target training images and the plurality of defect indications; or
the generated one or more feature representations of the one or more querying images.

39. The apparatus of claim 37, further comprising software that is operable when executed to:
obtain the one or more querying images using one or more optical camera sensors, wherein the one or more optical camera sensors capture the one or more querying images for the container of the pharmaceutical product from one or more angles, respectively.

40. The apparatus of claim 37, wherein the container comprises one or more of a cap, a seal, a stopper, a neck, a shoulder, a body, or a base.

41. The apparatus of claim 37, wherein the defect indication comprises one or more of a critical defect, a major defect, or a minor defect.

42. The apparatus of claim 41, wherein the pharmaceutical product comprises a lyophilized product, and wherein the critical defect comprises one or more of a cake appearance defect or a fill volume defect.

43. The apparatus of claim 42, wherein the cake appearance defect comprises one or more of a meltback, an extreme shrunken cake, an un-lyophilized cake, or a discoloration.

44. The apparatus of claim 41, wherein the pharmaceutical product comprises a lyophilized product, and wherein the major defect comprises a cake appearance defect, the cake appearance defect comprising one or more of an extreme product splash, a slanted cake, or a shrunken cake.

45. The apparatus of claim 37, wherein the target machine-learning model is based on a convolutional neural network.

46. The apparatus of claim 37, wherein each of the one or more predefined threshold scores is determined based on an acceptance quality limit associated with the defect indication.

47. The apparatus of claim 37, further comprising software that is operable when executed to:
access a plurality of target training samples, the target training samples comprising a plurality of target training images associated with containers of the pharmaceutical product and a plurality of defect indications associated with the plurality of target training images, respectively;
select a plurality of auxiliary training samples based on the target training samples, the auxiliary training samples comprising a plurality of auxiliary training images and a plurality of content categories associated with the plurality of auxiliary training images, respectively; and
train the target machine-learning model, the training comprising:
train an auxiliary machine-learning model based on the plurality of auxiliary training samples;
generate feature representations of the plurality of target training images based on the auxiliary machine-learning model; and
learn, based on the generated feature representations and the plurality of defect indications, a relationship between the feature representations of the plurality of target training images and the plurality of defect indications.

48. The apparatus of claim 47, wherein the pharmaceutical product comprises a lyophilized product, and wherein the lyophilized product is visible inside the containers in at least one of the target training images.

49. The apparatus of claim 47, further comprising software that is operable when executed to:

obtain the plurality of target training images using one or more optical camera sensors, wherein the one or more optical camera sensors capture one or more images for a selected product from one or more angles, respectively.

50. The apparatus of claim 49, further comprising software that is operable when executed to:

divide the plurality of target training images into one or more groups of target training images, the one or more groups being associated with the one or more camera sensors, respectively.

51. The apparatus of claim 50, wherein the software that is operable when executed to train the target machine-learning model further comprises software that is operable when executed to:

generate one or more groups of feature representations for the one or more groups of target training images associated with the respective camera sensors, respectively;

learn, based on the one or more groups of feature representations, one or more sub-models, respectively; and integrate the one or more sub-models to generate the target machine-learning model.

52. The apparatus of claim 51, wherein the target machine-learning model is based on a convolutional neural network comprising a plurality of layers, and wherein the software that is operable when executed to generate the one or more groups of feature representations comprises software that is operable when executed to:

divide the plurality of layers into one or more groups of layers corresponding to the one or more camera sensors, respectively; and process the one or more groups of target training images associated with the respective camera sensors by the one or more groups of layers.

53. The apparatus of claim 47, wherein the plurality of content categories comprises a plurality of handwritten numeric digits.

54. The apparatus of claim 47, wherein the plurality of content categories associated with the plurality of auxiliary training images do not match the plurality of defect indications associated with the plurality of target training images.

* * * * *